United States Patent
Suzuki et al.

(10) Patent No.: US 12,501,248 B2
(45) Date of Patent: Dec. 16, 2025

(54) METHOD AND SYSTEM FOR AUTOMATED PROVISIONING OF DATA FROM MULTIPLE SENSORS

(71) Applicant: BlackBerry Limited, Waterloo (CA)

(72) Inventors: Takashi Suzuki, Toronto (CA);
Stephen McCann, Southampton (GB);
Rene Faurie, Versailles (FR)

(73) Assignee: BlackBerry Limited, Waterloo (CA)

( * ) Notice: Subject to any disclaimer, the term of this patent is extended or adjusted under 35 U.S.C. 154(b) by 450 days.

(21) Appl. No.: 17/913,893

(22) PCT Filed: Apr. 3, 2020

(86) PCT No.: PCT/IB2020/000336
§ 371 (c)(1),
(2) Date: Sep. 23, 2022

(87) PCT Pub. No.: WO2021/198721
PCT Pub. Date: Oct. 7, 2021

(65) Prior Publication Data
US 2024/0089716 A1    Mar. 14, 2024

(51) Int. Cl.
*H04W 4/90*    (2018.01)
*H04L 67/02*    (2022.01)
*H04W 12/084*    (2021.01)

(52) U.S. Cl.
CPC .............. *H04W 4/90* (2018.02); *H04L 67/02* (2013.01); *H04W 12/084* (2021.01)

(58) Field of Classification Search
CPC ........ H04W 4/90; H04W 12/084; H04L 67/02
USPC ...................................... 455/404.1
See application file for complete search history.

(56) References Cited

U.S. PATENT DOCUMENTS

| | | | |
|---|---|---|---|
| 2018/0020091 A1 | 1/2018 | Self | |
| 2018/0144100 A1 | 5/2018 | Chalas et al. | |
| 2019/0380020 A1* | 12/2019 | Pellegrini | ............ G08B 25/006 |

FOREIGN PATENT DOCUMENTS

| | | |
|---|---|---|
| CN | 101213825 A | 2/2005 |
| CN | 1951096 A | 4/2007 |
| CN | 101909950 A | 12/2010 |
| CN | 107251585 A | 10/2017 |
| DE | 10238805 A1 | 3/2004 |
| WO | 0232098 A2 | 4/2002 |

OTHER PUBLICATIONS

Canadian Intellectual Property Office (CIPO) Official Action and Examination Search Report for Application No. 3,167,117 dated Oct. 16, 2023, 4 pages.

(Continued)

*Primary Examiner* — Maria El-Zoobi
(74) *Attorney, Agent, or Firm* — Moffat & Co

(57) ABSTRACT

A method at a Supplementary Data Provider within an emergency services network, the method including receiving a message at the Supplementary Data Provider, the message including an identifier and incident data; responsive to receiving the message, creating a resource at the Supplementary Data Provider based on the incident data, the resource being associated with the identifier; receiving an access request from an Emergency Services Provider for Supplementary Data associated with the resource; and responsive to receiving the access request, providing a response with the Supplementary Data.

19 Claims, 10 Drawing Sheets

(56) References Cited

OTHER PUBLICATIONS

China National Intellectual Property Administration (CNIPA): Office Action for Application No. 202080097591.2, dated Oct. 8, 2024, 15 pages.
ETSI EMTEL STF 555 TR 103 582: "Study of use cases and communications involving IoT devices in provision of emergency situations" (v1.1.1—Jul. 2019).
EENA: "Public Safety Digital Transformation—The Internet of Things (IoT) and Emergency Services" (v1.05—Mar. 3, 2016).
USDoC—NTIA: "Next Generation 911" (https://www.ntia.doc.gov/category/next-generation-911)—downloaded by Archive.org Jul. 18, 2019.
ETSI EMTEL TR 103 393: "Advanced Mobile Location for emergency calls" (v1.1.1—Mar. 2016).
IETF RFC 7852: "Additional Data Related to an Emergency Call" (Jul. 2016).
OASIS: Common Alerting Protocol—CAP v. 1.2 (Jul. 2010).
IETF RFC 3261: "SIP—Session Initiation Protocol" (Jun. 2002).
ETSI EMTEL TS 103 478: "Pan-European Mobile Emergency Application" (v1.2.1—Mar. 2020).
ETSI EMTEL TS 103 479: "Core elements for network independent access to emergency services" (v1.1.1—Dec. 2019).
NENA-STA-012.2-2017 "NENA Standard for NG9-1-1 Additional Data" (Dec. 2017).
APCO Project 4 3 "Broadband Implications for the PSAP—Analyzing the future of emergency communications" (Jun. 2017).
APCO NENA 2.105.1-2017 NG9-1-1 "Emergency Incident Data Document (EIDD)" (Jan. 2017).
EENA: "The Who Is Who Handbook in the Public Safety industry" (Nov. 2019).
EENA: "NG112 and the new Emergency Services Networks landscape—Challenges and opportunities" (Apr. 2018).
IETF RFC 5031: A Uniform Resource Name (URN) for Emergency and Other Well-Known Services (Jan. 2008).
IETF RFC 7231: "HTTP/1.1: Semantics and Content" (Jun. 2014).
IETF RFC 8141: "Uniform Resource Names (URNs)" (Apr. 2017).
IETF RFC 6749: "The OAuth 2.0 Authorization Framework" (Oct. 2012).
IETF RFC 8126: "Guidelines for Writing an IANA Considerations Section in RFCs" (Jun. 2017).
IETF RFC 3428: "SIP Extension for Instant Messaging" (Dec. 2002).
IETF RFC 5491: "GEOPRIV Presence Information Data Format Location Object (PIDF-LO) Usage Clarification, Considerations, and Recommendations" (Mar. 2009).
FCC Task Force on Optimal PSAP Architecture: "Optimal Approach to NG9-1-1 Implementation—Status Report" (Sep. 2016).
IETF draft-ietf-ecrit-data-only-ea-20: "Non-Interactive Emergency Calls" (Jan. 2020).
International Search Report, PCT/IB202/000336, mailed Dec. 3, 2020.
Nena: "NENA Detailed Functional and Interface Standards for the NENA i3 Solution", NENA-STA-010.2-2016, Sep. 10, 2016.
NENA i3 Standard for Next Generation 9-1-1, National Emergency No. Association (NENA) 911 Core Services Committee, i3 Architecture, Draft version under review—2019.
Canadian Intellectual Property Office (CIPO): Office Action for Application No. 3,167,117, Dated Sep. 16, 2024, 4 pages.
European Patent Office (EPO) Official Letter for Application No. 20 730 479.1 dated Jan. 26, 2024, 10 pages.
CNIPA (China National Intellectual Property Administration): Office Action for Application No. 202080097591.2, date: May 21, 2025, 5 pages.

\* cited by examiner

METHOD AND SYSTEM FOR AUTOMATED PROVISIONING OF DATA FROM MULTIPLE SENSORS

FIELD OF THE DISCLOSURE

The present disclosure relates emergency service response, and in particular relates to the provision of supplementary data to emergency service providers.

BACKGROUND

Emergency services are typically reached by utilizing an emergency number such as 911 in North America or 112 in Europe, among other options. However, such services were originally built on heterogeneous and isolated networks, such as analog or voice systems, and therefore next generation 911 (NG911) or next generation 112 (NG112) systems are being introduced. Such next-generation systems allow an Emergency Services IP Network to deliver voice, video, text and the data calls to a Public Safety Answering Point.

With the advent of such next-generation services, access to supplementary data, for example from Internet of Things (IoT) endpoints, by emergency services provider could benefit in response strategy and execution. However, current NG112 or NG911 emergency platforms do not support access to data relevant to a specific incident and originating from IoT devices and sensors. In order to utilize data from such IoT devices and sensors deployed close to the incident area or pertinent to the incident, the emergency services architecture needs to be enhanced to identify and access these data sources efficiently.

BRIEF DESCRIPTION OF THE DRAWINGS

The present disclosure will be better understood with reference to the drawings, in which.

DETAILED DESCRIPTION OF THE DRAWINGS

Figure 1:
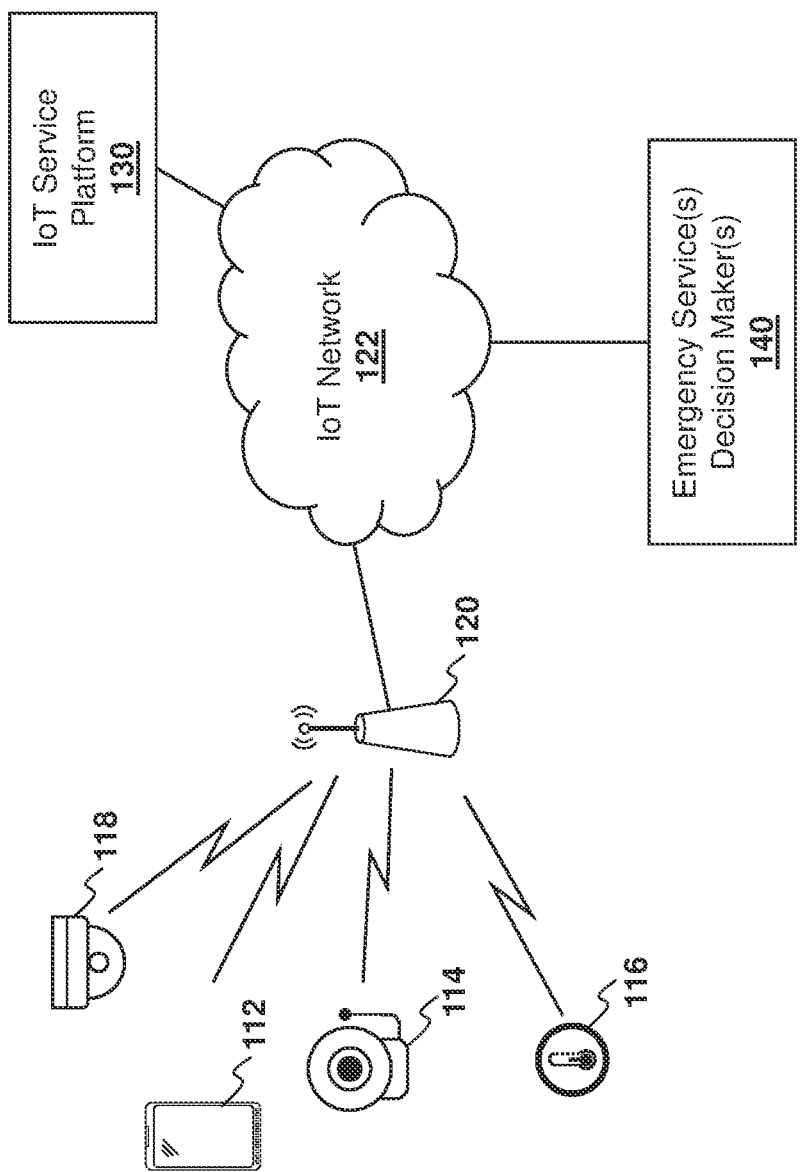
FIG. 1 is a block diagram from the European Telecommunications Standards Institute (ETSI) showing emergency services teams accessing pre-deployed Internet of Things devices.

The present disclosure provides a method at a Supplementary Data Provider within an emergency services network, the method comprising: receiving a message at the Supplementary Data Provider, the message including an identifier and incident data; responsive to receiving the message, creating a resource at the Supplementary Data Provider based on the incident data, the resource being associated with the identifier; receiving an access request from an Emergency Services Provider for Supplementary Data associated with the resource; and responsive to receiving the access request, providing a response with the Supplementary Data.

The present disclosure further provides a Supplementary Data Provider within an emergency services network, the Supplementary Data Provider comprising: a processor; and a communications subsystem, wherein the Supplementary Data Provider is configured to: receive a message, the message including an identifier and incident data; responsive to the receipt of the message, create a resource at the Supplementary Data Provider based on the incident data, the resource being associated with the identifier; receive an access request from an Emergency Services Provider for Supplementary Data associated with the resource; and responsive to receipt of the access request, provide a response with the Supplementary Data.

The present disclosure further provides a computer readable medium for storing instruction code, which, when executed by a processor of a Supplementary Data Provider within an emergency services network cause the Supplementary Data Provider to: receive a message, the message including an identifier and incident data; responsive to receipt of the message, create a resource at the Supplementary Data Provider based on the incident data, the resource being associated with the identifier; receive an access request from an Emergency Services Provider for Supplementary Data associated with the resource; and responsive to receipt of the access request, provide a response with the Supplementary Data.

Currently there is no common or standardized solution to share, with emergency services, pertinent data produced by Internet of Things (IoT) devices or other data sources. Such data sources may be connected to public or private communications networks and cloud-based applications, but are not available to emergency platforms such as Next Generation 911 (NG911) or Next Generation 112 (NG112).

In particular, ETSI has established a Special Committee (SC) on Emergency Communications (EMTEL), which has studied use cases involving IoT devices in the provision of emergency situations. This group has published a technical report ETSI EMTEL TR 103 582: "*Study of use cases and communications involving IoT devices in provision of emergency situations*", v.1.1.1, July 2019, which includes eight use cases and requirements derived from them.

A number of the deployed IoT devices, sensors or actuators are not intended or designed for public safety purposes and do not require dedicated emergency features or connectivity in order to fulfil their primary function while operated for consumer or business-oriented applications in domains such as smart cities or buildings, automotive, transportation, home or industrial IoT, connected to healthcare or agriculture, among other options.

In one use case, emergency service teams may access pre-deployed IoT devices control or data. In accordance with the present disclosure, an emergency service team comprises members managing and coordinating the emergency service operations, and may include members of an emergency mission in or near the incident area. Examples include first responders such as fire crew, police officers, technical and medical staff, among others. For example, reference is now made to FIG. 1. In the embodiment of FIG. 1, IoT devices such as a mobile phone 112, an alarm system 114, a temperature monitoring system 116, a video camera 118, among other options for IoT devices may communicate through an access point 120 with an IoT network 122. In this case, the IoT service platform 130, along with the devices, may be pre-deployed to communicate with an emergency services decision-maker 140. Thus, in an emergency in a private or public building or in an area with a pre-deployed IoT based safety system, IoT devices and the building safety system can provide additional helpful information to emergency service teams.

Various use cases for such pre-deployed devices exist. For example, the NG112 system is a framework for the European Union aiming at aggregating multiple emergency calling technologies, Public Safety Answering Point (PSAP) models, routing policies, among other options, through emergency service networks. NG112 is largely based on the Long-Term Definition (LTD) European Emergency Number Association (EENA) architecture.

Figure 2:
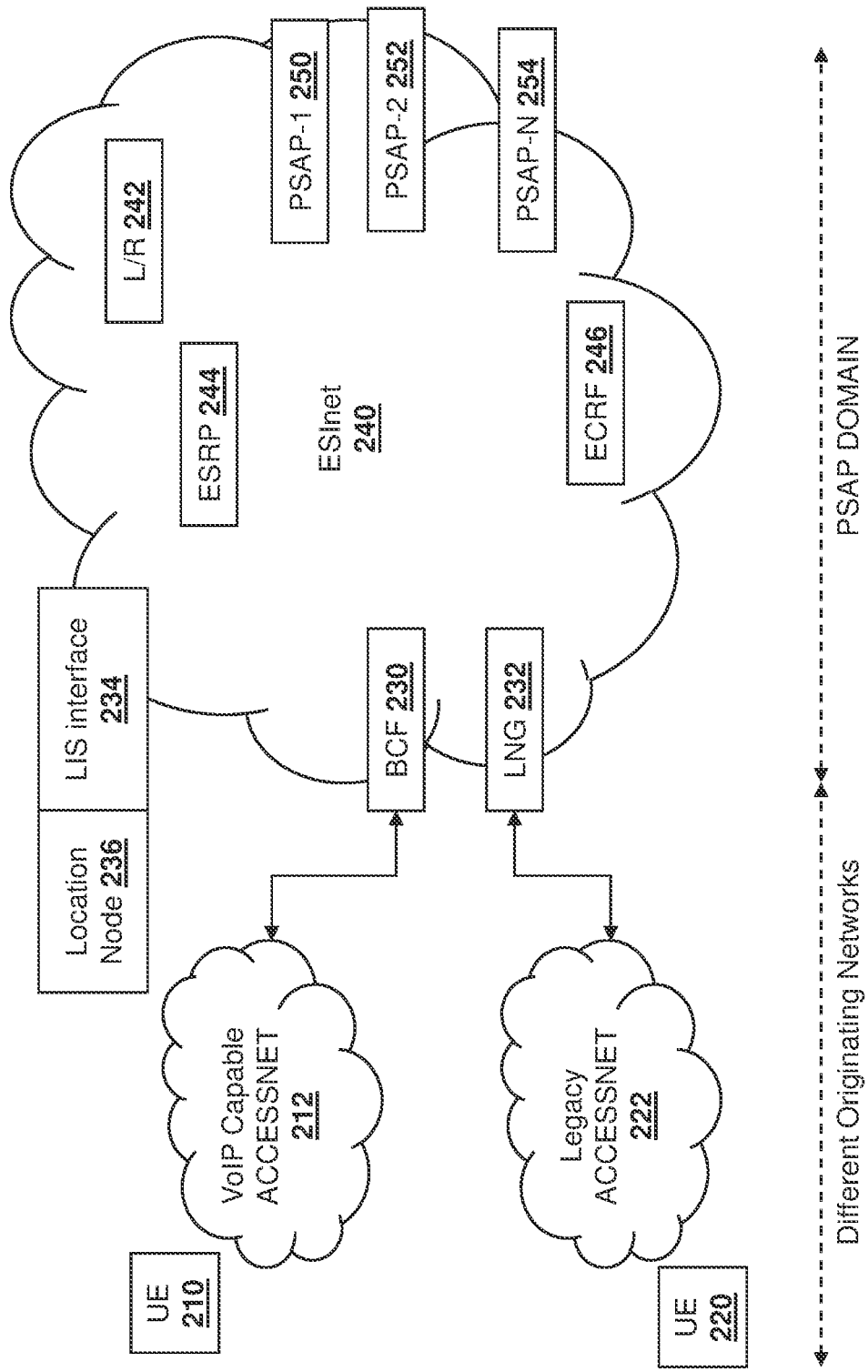
FIG. 2 is a block diagram showing an example Next Generation 112 architecture.

One example of the NG112 architecture is shown with regard to FIG. 2. In the example of FIG. 2, a user equipment (UE) 210 communicates with a Voice over Internet Protocol (VoIP) capable access network 212. Similarly, a UE 220 communicates with a legacy access network 222. As used herein, a UE can be a cell phone, a fixed phone, a mobile device, or any other electronic device, with wired and/or wireless communications capability.

The VoIP capable access network 212 communicates with a Border Control Function (BCF) 230 to access the Emergency Services IP network (ESInet) 240. The legacy access network 222 communicates with a Legacy Network Gateway (LNG) 232 to access the ESInet 240.

The UEs and access networks form part of different originating networks, whereas the emergency services network, including the Border Control Function 230 or the Legacy Network Gateway 232 form part of a PSAP domain. The PSAP domain provides a Location Information Server (LIS) interface 234 to location node 236.

The emergency services network 240 includes various functional blocks, including a Log and Record (L/R) entity 242, an Emergency Service Routing Proxy (ESRP) 244, an Emergency Call Routing Function (ECRF) 246, and a plurality of PSAPs, designated as PSAP-1 250, PSAP-2 252 and PSAP-N 254. The L/R entity may also provide an auditing capability, e.g. for post-analysis of emergency incidents.

Figure 3:
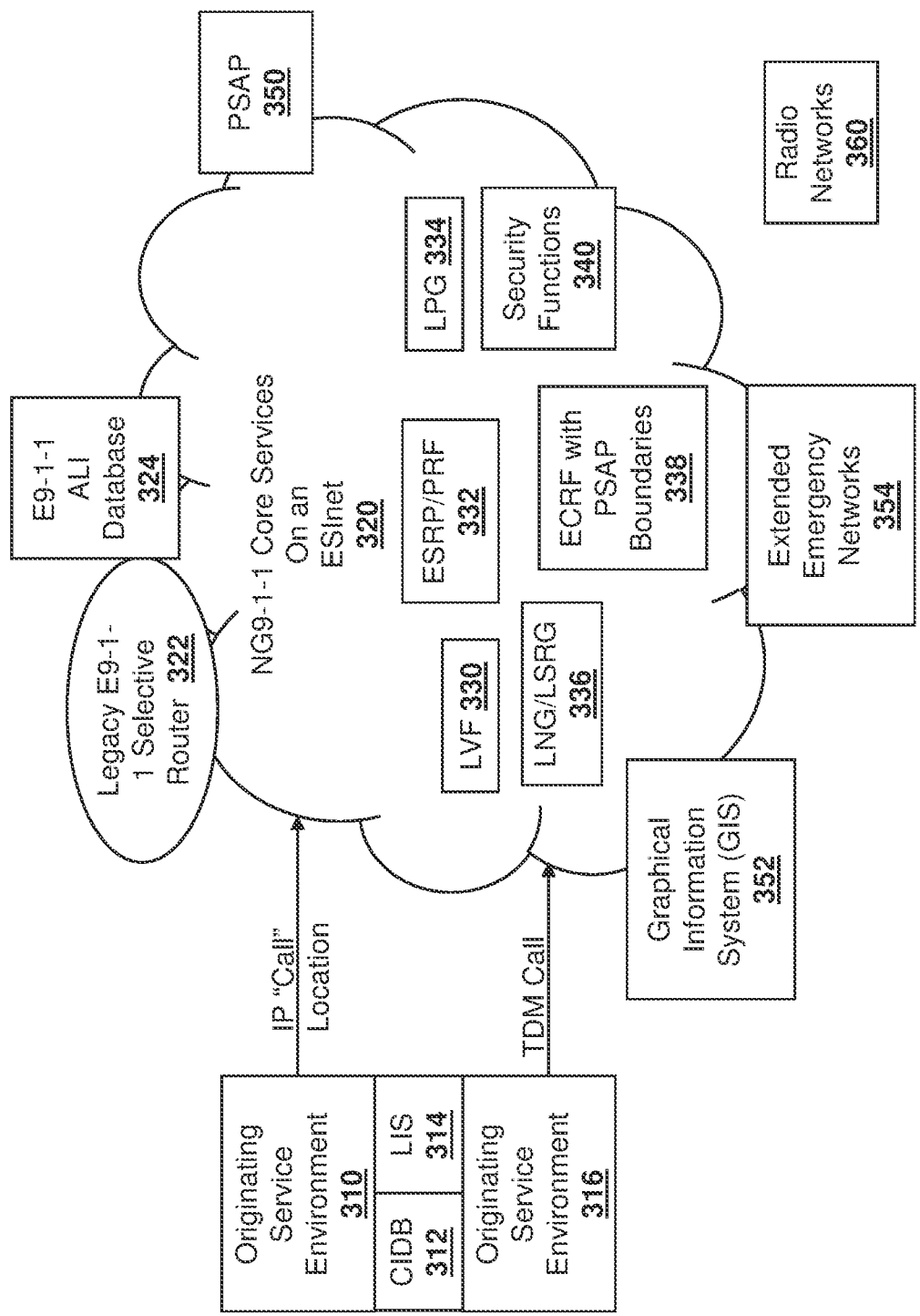
FIG. 3 is a block diagram showing an example Next Generation 911 architecture.

Similarly, an example of the Next Generation 911 system is shown with regard to FIG. 3. In the embodiment of FIG. 3, an originating service environment 310 may have access to a Call Information Database (CIDB) 312 or Location Information Services (LIS) 314. Similarly, an originating service environment 316 may also have access to CIDB 312 or LIS 314.

The originating service environment 310 may make an Internet protocol (IP) call to the NG911 core services network 320. Such core services network 320 may include access to legacy E911 selective routers 322 and an E911 Automated Location Information (ALI) database 324.

Various functional elements are shown in the embodiment of FIG. 3, including a Location Validation Function (LVF) 330, an Emergency Service Routing Proxy/Policy Routing Function (ESRP/PRF) 332, a Legacy PSAP Gateway (LPG) 334, a Legacy Network Gateway/Legacy Selective Router Gateway (LNG/LSRG) 336, an ECRF with PSAP boundaries 338, and security functions 340.

Further, the PSAP 350 may include a call taker system, map display, computer aided dispatch (CAD), logging and reporting, among other functionalities.

The system may further include a Graphical Information System (GIS) 352 as well as Extended Emergency Networks 354. Extended Emergency Networks 354 may include various entities in a particular country. For example, in the United States these entities may include Homeland Security, the Federal Emergency Management Agency (FEMA), town halls, among other options.

The core services network 320 may further have access to other radio networks 360 or wired networks (not shown).

Utilizing the environment of FIG. 2 or 3, emergency services currently allow for the use of additional data from a mobile device. For example, the National Emergency Numbering Association (NENA) provides a standard for detailed functional and interface specification for IP-based multimedia telecommunications system to support delivery of emergency calls by emergency services IP network. This standard is published as NENA-STA-010 *"NENA i3 standard for next generation 9-1-1"*.

The NENA i3 call interface is a Session Initiation Protocol (SIP) interface and is, for example, defined in the Internet Engineering Task Force (IETF) RFC 3261: *"SIP-Session Initiation Protocol"*. Utilizing this interface, calls may include one or more forms of media, including but not limited to audio, video and/or text. SIP may be utilized to call a 911 caller back, and is the protocol for calls between agents within the ESInet.

The MESSAGE method provides an extension to SIP, allowing the transfer of instant messages and is also used to carry a common alerting protocol (CAP) message. The MESSAGE method is used for originating non-interactive calls. MESSAGE requests carry the content in the form of Multipurpose Internet Mail Extensions (MIME) body parts. Utilizing SIP, header fields in INVITE and MESSAGE may be required for originating emergency calls. Information in the header fields may include an identity for providing caller identity assertion, a request Uniform Resource Indicator (URI), a 'To' and a 'From the' field, among other possibilities. As used herein, a URI comprises a string of characters that unambiguously identifies a particular resource and follows a predefined set of syntax rules, but also maintains extensibility through a separately defined hierarchical naming scheme.

Various call information may be also provided. For example, additional data may be available. Various standards for providing additional data include NENA-STA-012.2-2017 *"NENA Standard for NG9-1-1 Additional Data"*; APCO NENA 2.105.1-2017 *"NG9-1-1 Emergency Incident Data Document (EIDD)"*; or IETF RFC 7852 *"Additional Data Related to an Emergency Call"*, among other options. In particular, with the implementation of NG911 there will be many forms of additional data available to telecommunicators and emergency responders beyond the primary call data from SIP INVITE and MESSAGE, and the primary street address and/or geodetic location data. The additional data is related to three entities commonly associated with an emergency call: the caller placing the emergency call, the location the emergency call is placed from, and the call itself. Call-info headers included with the SIP INVITE or MESSAGE method may include a URI pointing to an externally-hosted source for the referenced additional data or can include the data by value in the call. As described below, when additional data is passed "by reference", it is retrieved via a Hypertext Transfer Protocol Secure (HTTPS) or Hypertext Transfer Protocol (HTTP) GET operation issued against the referenced Additional Data Repository (ADR) in which the additional data is stored. Data collected by the PSAP while handling the call is captured in an Emergency Incident Data Document (EIDD) and passed to other agencies that are involved with the incident.

In other cases, the call information may include a call identifier. In this case, emergency calls may include voice calls, video calls, text calls, non-interactive calls, among other options. The first entity that handles the call is the NG911 emergency platform, which assigns the Call Identifier. The form of a Call Identifier may be a Uniform Resource Name (URN) formed by a prefix "urn:nena:uid:callid", a unique string containing alpha and/or numeric characters, the ":" character, and the Element Identifier of the element that first handled the call. For example, this may be "urn:nena:uid:callid:a56e556d871:bcf.state.pa.us". The call identifier is added to a SIP MESSAGE using a call-info header field with a purpose of "nena-CallId". Such URN may be, for example, defined in IETF RFC 8141: "Uniform Resource Names (URNs)".

The Call-Info may further contain an incident tracking identifier. The incident tracking identifier may be locally generated and assigned by the first entity in the NG911 emergency platform that handles an emergency call or declares an incident. The incident identifier is added to a SIP MESSAGE using a Call-Info header field with a purpose 903 of "nena-IncidentId". The form of an incident tracking identifier is a URN formed by the prefix "urn:nena:uid:incidentid", a unique string containing alpha and/or numeric characters, the ":" character, and the element identifier of the entity that first declared to the incident. For example, the URN may be "urn:nena:uid:incidentid: a56e556d924:bcf-.state.pa.us". The string is typically unique for each incident the element handles over time. One way to create a unique string is to use a timestamp with a suffix that differentiates multiple incidents if they could be created at the same instant.

Clearinghouse

As used herein, a clearinghouse is a standards compliant Location Information Server (LIS) and an Additional Data Repository (ADR) that is accessible to emergency personnel through a portal or through integration with a PSAP's existing equipment and software. One example of such clearinghouse is the RapidSOS Clearinghouse, as for example described in RapidSOS—Karen Marquez "RapidSOS Clearinghouse", April 2019.

Figure 4:
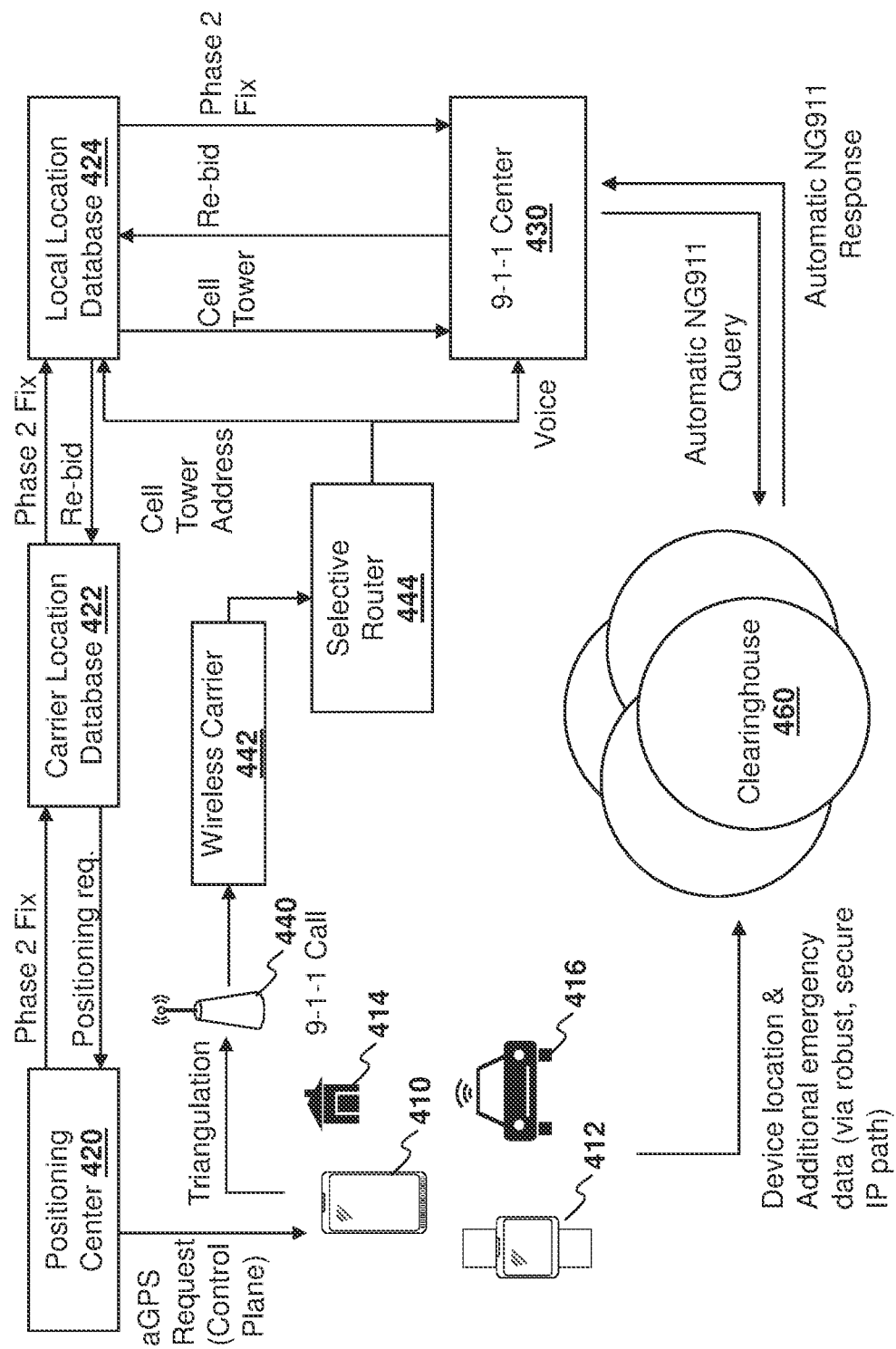
FIG. 4 is a block diagram showing the role of a clearinghouse within an emergency 911 architecture.

Reference is now made to FIG. 4 which shows an example of a clearinghouse within an NG911 architecture. In the example of FIG. 4, a device such as a user equipment 410, a wearable device 412, an IoT device 414 or a connected vehicle 416 may send relevant data to 911 call takers and first responders upon PSAP call-back to a clearinghouse. In particular, such devices may communicate with a positioning center 420 which may find the position of the devices as reported by the devices. The positioning center 420 may provide a Phase 2 Fix to Carrier Location Database 422, which may forward the Phase 2 Fix to a location database 424. The Phase 2 Fix may then be provided to the 911 center 430.

Devices may further communicate with an access point 440 such as a cellular tower which may use triangulation to determine a location of such a device. The access point will, in the case of a cellular tower, communicate with a wireless carrier 442 and provide data through to a selective router 444.

The selective router 444 may provide a cell tower address to the local location database 424 and establish a voice path with the 911 center 430.

The location database 424 may forward cell tower information to the 911 center 430.

In addition to the above-mentioned information, device location and additional emergency data may be provided to a clearinghouse 460 through a robust, secure IP path. The device location information may include latitude and longitude coordinates, the address of a building, a floor where the device is located, floorplan, contact information, company name, caller profile data, among other such information.

For example, and depending on the device, other data may be provided including the name, age, gender, member identifier, critical health information, or other such information about the device owner. In another example, the additional data may include information about the car from which the emergency call is triggered. The amount and type of data collected may be dependent on the privacy rules of the region or country where the device is located.

As can be seen, however, from FIG. 4, all of the information provided to the 911 center through the clearinghouse or through the other databases is associated with the physical device or the caller initiating the 911 call.

Additional Data Repository

The Additional Data Repository, whether part of or separate from a clearinghouse, is a database that holds additional data as a functional element in the 3 NENA NG911 architecture. Similar principles apply with the EENA NG112 architecture.

The ADR contains information which can be associated with an emergency call or caller, and is managed and sourced from outside of the ESInet. The device, originating network or caller could operate an ADR, or it could supply the data to a third party which operates the ADR.

All originating networks and service providers are expected to provide at least a minimum set of information corresponding to information that was available to legacy 911 systems, which must be populated in an ADR when passed by reference, or provided in the body of a SIP transaction when passed by value. Access networks are expected to provide the same minimum set of information.

Some ADRs are called "Identity Searchable" ADRs (IS-ADR) and have an optional feature that allows the repository to be searched by the caller's identity, e.g. the caller's Uniform Resource Identifier (URI). This capability is needed when data is stored by an entity that is not in the path of the call or access network. For example, this may occur when personal medical data provided by the caller is stored by an entity trusted by the caller to keep such data.

The availability of additional data for a given call is indicated by various techniques. For example, a first technique may be through the Additional Data Call-Info headers within an initial message of a SIP transaction. These headers may contain additional data by value or by reference.

A second technique may be through Additional Caller Data which may be retrieved by querying IS-ADRs.

A third technique may be through URIs appointed to Additional Location Data which may be discovered with an associated Additional Data service URN.

A fourth technique may be utilizing the presence of additional data blocks by value and/or by reference in the element conveying location information. This may include Presence Information Data Format-Location Object (PIDF-LO).

The above techniques may be used in isolation or in combination with each other. The sourcing of additional data may be done through various mechanisms.

In a first mechanism, the sourcing of the Additional Data may be done "by reference". In this case, Call-Info headers may be included with the caller's SIP INVITE or MESSAGE method that includes a URI pointing to an externally hosted ADR. The Additional Data may then be retrieved via an HTTPS GET operation against the referenced ADR. The location information in the SIP transaction may also contain Additional Data by reference.

A second mechanism may include sourcing additional data "by value". In this mechanism, Call-Info headers may contain a "Content ID" URL pointing to the SIP transaction contents that contain an additional data XML document. The location information may also contain additional data by value.

A third mechanism for sourcing Additional Data may include a "queried" approach. In this case, Additional Data is retrieved by querying a resource using information associated with the call. For example, such information may include an ADR for Additional Data for the location or an IS-ADR for Additional Data for the caller.

Devices such as those within telematics-equipping vehicles and medical monitoring devices that can place emergency calls could have the capability to respond to an ADR query, or could publish data to an external ADR that would respond to dereferenced requests. A service provider such as a telematics service provider may provide a reference to the ADR instead of to the device. Other devices may also provide an ADR for use in an emergency call.

An IS-ADR may provide a web service. When queried with a caller's From address or P-Asserted-Identity (as retrieved from the SIP header field), the IS-ADR may return a response which may include, but is not limited to: an XML document containing the caller's Additional Data (by value); a URI that can be used to dereference the caller's Additional Data; an HTTP 333 response (Iterative Refer), instructing a client to direct an additional data query to the resource specified in the response; and/or an indication that no data was found for the provided From or P-Asserted-Identity URI.

In the above, the transaction to dereference the Additional Data URI is typically protected. For example, it may be protected with Transport Layer Security (TLS). The dereferencing entity, which may be an ESRP, a PSAP, or a responding agency, uses its credentials to dereference the Additional Data URI. The originating network or the service provider can use any credential, as long as the domain listed in the URI is the domain of the SubjectAltName in the credential.

The ADR will typically accept certificates traceable to the PSAP credential agency (PCA). ESInet entities may only accept certificates for the ADR signed by a credentialing authority (CA) recognized by common Web browsers in some cases.

ADRs can host sensitive data for which the disclosure may be subject to legal, regulatory, privacy and confidentiality requirements and/or local policy. All ADR queries originating within an ESInet typically would include authentication by credentials traceable back to the PCA. An ADR may serve less-sensitive data in the event PCA-traceable authentication fails. All ADRs generally serve data for any valid query. A call-stateful ADR may limit the length of time that it will serve data after the end of an associated emergency call.

Authorization Framework

In order to provide for the above, an authorization framework may exist. For example, the OAuth 2.0 authorization framework is described in IETF RFC 6749, "The OAuth 2.0 Authorization Framework".

The OAuth 2.0 authorization framework enables a third-party application to obtain limited access to an HTTP service, either on behalf of resource owner by orchestrating an approval interaction between the resource owner in the HTTP service, or by allowing the third-party application to obtain access on its own behalf.

An authorization grant is a credential representing the resource owner's authorization to access protected resources used by the client to obtain an access token. The framework defines four grant types, namely: authorization code; implicit; resource owner password credentials; and client credentials, as well as an extensibility mechanism for defining additional types.

The client credentials or other forms of client authentication can be used as an authorization grant when the authorization scope is limited to the protected resources under the control of the client, or to protected resources previously arranged with the authorization server. Client credentials are used as an authorization grant typically when the client is acting on its own behalf such as when the client is also the resource owner, or when the client is requesting access to protected resources based on an authorization previously arranged with the authorization server.

If the client is a confidential entity, the client and authorization server establish a client authentication mechanism suitable for the security requirements of the authorization server. The authorization server may, but does not necessarily, accept any form of client authentication meeting its security requirements. Confidential clients are typically issued or establish a set of client credentials used for authenticating with the authorization server. Examples of such credentials may include a password, a public/private key pair, among other options.

Supplementary IoT Data

While the above examples provide for the use of additional data with next generation emergency services, none of the above architectures have any common or standardized solution to share, with emergency services, pertinent data produced by deployed IoT devices or other data sources that are not on the communication path between the device calling for emergency services and emergency services providers. In particular, no common or standardized way exists to identify and select data sources other than the device initiating an emergency call or session and to provide selected data relevant to a specific incident to the emergency service in an efficient manner.

In order to utilize data from IoT devices and sensors deployed close to an incident area or pertinent to the incident, an emergency services architecture needs to be enhanced to identify and access these data sources efficiently. These data sources may belong to, or be managed by, private companies or authorities, by district administrations or by individuals, and may pertain to different networks and be outside of the emergency call path. Therefore, an appropriate functional architecture and dedicated procedure is defined herein so the data sources and the data that they originate can be accessed for emergency purposes beyond their primary or conventional operation.

Further, in the embodiments described below, registration, identification, and selection of IoT data sources is provided for. Specifically, means to register data sources such as deployed IoT sensors or devices for their use in emergency purposes are provided. Such mechanisms allows for proper identification of either the characteristics of the IoT devices and the capabilities of such devices in order to allow for the selection of relevant devices for a specific incident. For example, no common (or standardized) solution currently exists in which appropriate information, characterizing the data sources for a registration discovery process, is made available to commercial or emergency infrastructure. Similarly, no common (or standardized) solution allows for the selection of the pertinent data sources, for example based on querying the servers containing data source information.

Further embodiments are described to allow for data originating from selected IoT data sources to be made available to an emergency services platform and to allow the platform to access such data. Mechanisms to identify and access the IoT data pertinent to the specific emergency situation are described.

In further embodiments, credential management is provided for. In particular, the NENA i3 standards for Next Generation 911 assume that TLS is used between the emergency services operator and an ADR and that long-term credentials will be provisioned. If such credentials are linked to a malicious or unauthorized entity, this entity may be able to access the ADR or other data sources. Therefore, the embodiments described below provide for a mechanism to specify and restrict the scope of access authorization.

Architecture Model

Figure 5:
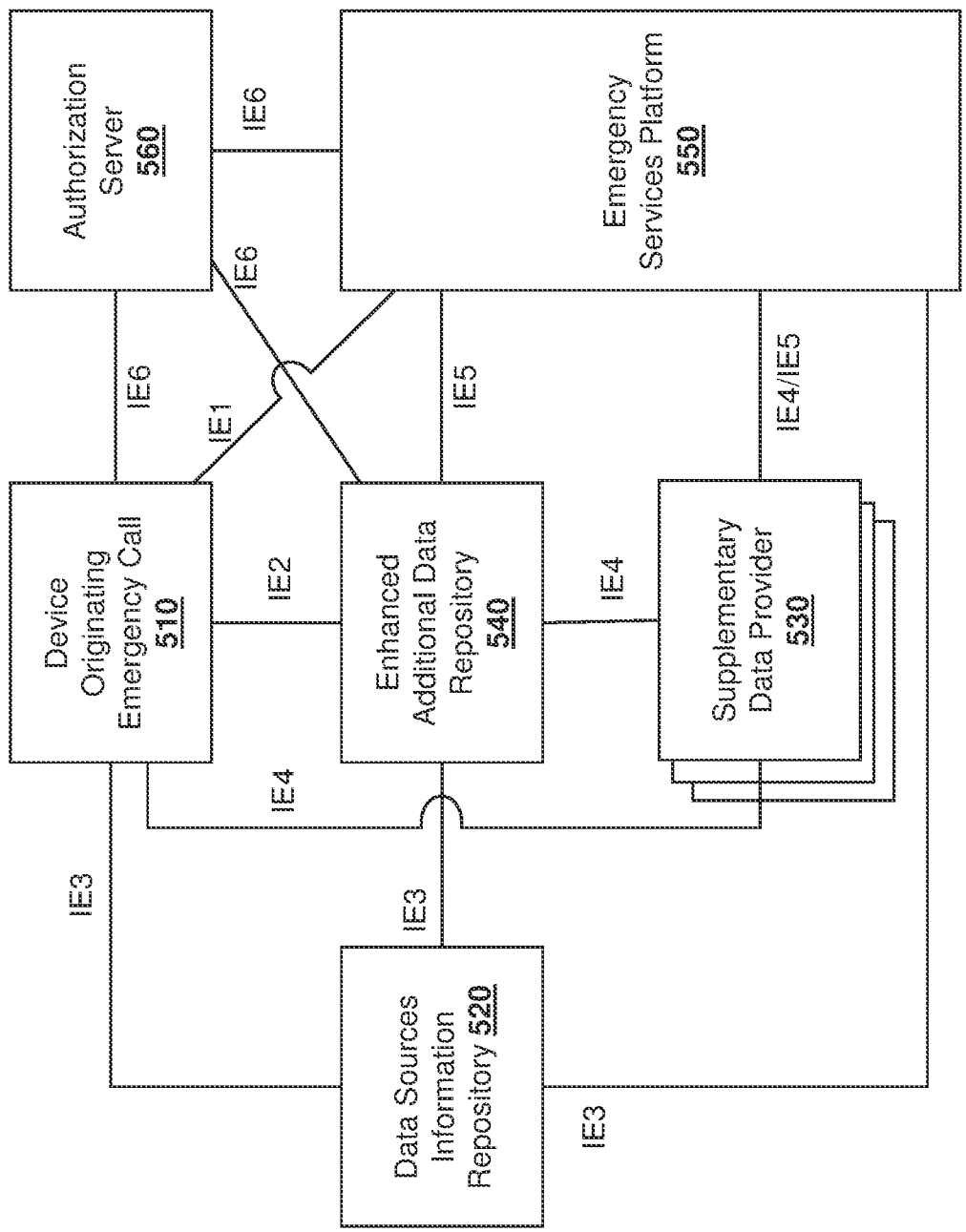
FIG. 5 is a block diagram showing an example emergency services architecture model in accordance with the embodiments of the present disclosure.

Reference is now made to FIG. 5, which shows an example architecture model for providing additional data to an emergency services platform. Specifically, in emergency scenarios including smart city, smart building or enterprise, data from multiple IoT devices such as security cameras, thermostats or other sensors located near to the emergency caller or relevant to a signaled incident may provide useful information to build a Common Operation Picture (COP) for emergency service operators and first responders, and improve situational awareness of the incident. As used herein, the COP is a common overview of an incident that is created by assessing and fusing information from multiple sources, and is shared between appropriate command, control and coordinating groups to support joint decision-making for example in the context of situational awareness.

Data sources that may be considered for emergency purposes include, but are not limited to, building sensors such as temperature, air conditioning, water leak detection, electricity, lighting, among others; enterprise cameras; factory or industrial control sensors such as cameras, gas detectors, infrared sensors, radiofrequency identifier (RFID), among others; application sensors in an IoT network, using a private or commercial IoT platform, telematics data delivered by vehicles or road infrastructure, alarms, embedded sensors or other equipment; nursery or hospital sensors pertaining to patient health care such as biometric devices among others or pertaining to administration; consumer sensors such as wearable devices, cameras, microphones, among others; and/or links to a smart phone or other equipment. These Supplementary Data sources that can be used for emergency purposes may be connected to different communication networks, using different technologies, and may be owned or controlled by different individuals or administrators.

Therefore, as used herein, Supplementary Data (SD) is a set of data generated by devices including IoT devices, sensors and other data sources, that may be pertinent to a specific incident. The SD is typically originated by sources other than the device originating the emergency call. The SD source may be located in the vicinity of the incident site and may be correlated to the incident by differing manners. For example, the sensor may be a water height sensor along the same flooding river or tributaries. The pertinence of the SD to the incident may be established by different entities of the emergency architecture. For example, the pertinence may be established according to policies or determined criteria as disclosed herein. The SD may complement the additional data originated from the device or the user having initiated to the emergency call or session.

These data sources could be registered or enrolled as described below so that they can be further accessed for emergency purposes in addition to their normal operations for commercial applications. The registration of data sources for emergency services does not presuppose that these data sources have the capability of originating an emergency call or emergency data only/non-interactive session or are associated or connected to a device having such capabilities as a device originating the emergency call.

Therefore, the embodiments described herein provide for a framework which enables other data sources that are not directly involved an emergency call or incident, such as pre-deployed IoT devices or sensors, telematic or environmental data sources, or other devices located or dispatched in the vicinity of the incident, to share supplementary data deemed to be pertinent for the emergency services. Such data, referred to herein as Supplementary Data (SD), is therefore supplementary to the data made available to the emergency services provided by the calling device or the ADR as described above.

In accordance with the embodiment of FIG. 5, a sufficient set of information characterizing each SD source may be recorded in a repository, referred to herein as a Data Sources Information Repository (DSIR). The DSIR can then be queried by the other entities involved in the processing of an emergency incident, including a Device Originating the Emergency Call (DOEC), an Enhanced Additional Data Repository (E-ADR), a Supplementary Data Provider (SDP) or the Emergency Services Platform (ESP), so that the relevant data can be identified, accessed and retrieved as necessary. In this case, the ESP may be the PSAP in charge of the incident response through the ESInet.

Therefore, in the embodiment of FIG. 5, the DOEC 510 interfaces with the DSIR 520, one or more SDP(s) 530 and the E-ADR 540.

The DOEC 510 is a device such as a smart phone or an IoT device that originates an emergency call or a call to an ESP 550, for example by calling an emergency number depending on the region of operation, or by sending an emergency message to a URN for a SIP call or alarm. The device may be capable of deriving its location when it originates the call. For example, an Emergency Location Service calculates the device location locally by using techniques such as those defined in ETSI EMTEL TS 103 393, *"Advanced Mobile Location for Emergency Calls"*.

The DOEC may provide additional information including location information to the ADR or E-ADR, or to the ESP. The DOEC may also provide address information such as the URI of the ADR, E-ADR, or SDP to the ESP within a Call-Info header. In some cases, the SDP address may be preconfigured in the DOEC. The DOEC may also provide additional information during the call or during call establishment, using the SIP INVITE, re-INVITE, SIP UPDATE, or SIP INFO methods. In this case, a SIP re-INVITE is a SIP INVITE sent as part of an existing dialogue.

The DOEC 510 communicates with the DSIR 520 over an IE3 interface, as defined below. The DSIR 520 is an entity which stores and supplies information about the data sources that can be accessed for emergency services purposes. For example, the DSIR may include the location of an IoT device, types of data the IoT device produces, as well as information allowing the location and retrieval of the data, including the URI of the SDP that holds the data, possibly the URI pointing to the data resource in the SDP, among other options.

In some embodiments, the DSIR 520 may be a centralized DSIR. In other embodiments, the DSIR 520 may be distributed.

In some cases, the DSIR, or one or more of the DSIR distributed components, may be part of the ESP 550. In other embodiments, the DSIR 520 or one or more of the DSIR distributed components may be owned or administered by a governmental or emergency service administrator or commercial entity. In some embodiments, the DSIR or one or more of the DSIR distributed components may be owned or administered by a commercial entity such as a private corporation.

In some implementations, access to the IoT resources related data may be subject to specific restrictions based on information confidentiality or privacy. Such restrictions may be recorded in the DSIR.

As the data sources may be external to the emergency infrastructure involved in an incident and may belong to private companies or independent organizations, these data sources may need to be registered to the emergency authorities for being listed in the DSIR.

In some cases, the DSIR 520 may be accessed via an application program interface (API) as a Web service. In some cases, the DSIR may be an IoT DSIR. Specifically, in which case the DSIR may refer to IoT data sources. In other cases, the DSIR may be an emergency DSIR, in which case the DSIR may refer to data services accessible for emergency services purposes. In some cases, the API allowing access to the DSIR may also provide result codes with messages indicating success and/or failure.

The DOEC 510 may further communicate with one or more SDPs 530 over an IE4 interface as described below. Each SDP is a resource server or Web service. The SDP may reside on an IoT platform, a server, or a gateway in a cloud. The SDP holds SD that may be relevant to a specific incident. For example, the data may include a temperature value obtained from a thermostat located in the vicinity of the incident or of the DOEC. The data may be used for commercial or private purpose in a normal operation. The SDP holding SD relevant to the incident and the related resources may be identified and located via an information record in the DSIR 520.

Thus SD may comprise data from an IoT device/sensor and may be provided by a commercial or a private application on an IoT platform to the ESP. In the present framework, the SD can be accessed via a SDP. As used herein, an SDP is a functional entity which provides SD to the ESP. The SDP may be an IoT platform, a server, a gateway, a device, a Web service, among other options.

The SDP may provide APIs to create a resource to provide SD associated with a specific incident for the ESP and also to delete the resource later on. The ESP may call the API to delete the resource when the SD is no longer required. Alternatively, the SDP deletes the resource after some inactive period, or after a certain period has passed since its creation. The API allowing access to the SDP may also provide result codes with messages indicating success and/or failure.

For example, the resource may be created using an HTTPS PUT or POST method and accessed using HTTPS GET method, as described below. The resource created in the SDP may be uniquely identified by the SD identity. The resource is associated with the data relevant to a specific incident. The SDP may determine which data to share with the ESP when creating the resource according to a configured policy, for example, according to regulatory compliance or privacy protection rules avoiding unnecessary data leakage or privacy breach. The SDP may also request the data source (e.g. an IoT device or sensor), corresponding to the SD, to provide up to date data so that when the ESP requests access, the SDP can provide the up to date information.

Alternatively, some data resource registered by the DSIR may be accessed without requiring the creation of a resource by the client accessing the SDP. In this case the resource is assumed to already exist in the SDP, e.g. as a data record in the SDP, and can be directly accessed using the resource reference, e.g. an URI, provided by the DSIR. In some examples, the considered resource may be created when the corresponding data source is registered in the DSIR, or at another time, by the SDP administrator. As above, the access to the resource may be performed using an HTTPS GET method.

Further, while the number of (IoT) data sources and of IoT networks increases and the volume of related data scales up, it may not be efficient or practical to aggregate all the SD accessible for emergency purposes into a single repository. To address the issue, the reference architecture of FIG. 5 supports multiple SDPs or distributed SDPs. The ESP will access one or more SDPs 530 identified by the DSIR 520.

Based on the architecture disclosed above, if requested to create a resource for an ESP to access the data, the SDP 530 provides the data to the ESP through a resource. The SD may be accessed via an API targeting the resource. Alternatively, an explicit resource creation step may not be required, such as if the resource is preconfigured in the SDP at a data source registration in the DSIR.

The data accessed via an SDP may be limited to a subset of the data that the SDP holds. For privacy or other policy reasons, only this subset of data may be provided to the ESP in some cases.

As described above, additional data related to the emergency call, the location, the caller, among other such additional data may be stored in and served by an ADR or E-ADR. Meanwhile, data made available through the SDP includes data from one or more other sources. The ESP uses data as supplementary to the data provided by the DOEC, ADR or E-ADR to complement the COP of an emergency incident.

The DOEC 510 may further communicate with the E-ADR 540 over an IE2 interface as described below. The E-ADR is an ADR offering enhanced features according to the present embodiments. In addition to storing and supplying "additional data" characterized as either pertaining to the call, the location or the caller of an emergency call as in a conventional ADR described above, the E-ADR may determine one or more SD sources relevant to a specific incident by querying the DSIR 520. Further, the E-ADR may request the corresponding SDP to create a resource for the ESP 550 to access the SD. The SDP may provide an API as defined by the present disclosure for the creation and subsequent deletion of the resource.

The DOEC 510 may further communicate with the ESP 550 over an IE1 interface as described below. ESP 550 offers services for public safety authorities such as the police, fire or medical services that are reachable by calling a dedicated access number such as 911 in North America or 112 in Europe, among other such numbers throughout the world, or by sending an emergency message to a URN such as urn:service:sos. New generation emergency services are generally accessible through an ESInet comprising call routers such as ECRFs, PSAPs or emergency call centers. In the context of the present disclosure, ESP 550 receives an emergency call from a DOEC 510 and accesses one or more SDPs providing access to SD relevant to the emergency for supplementing the COP that will be used to provide an appropriate emergency response.

Further, as seen in FIG. 5, one or more of the DOEC 510, ESP 550 and E-ADR 540 may communicate with an authorization server (AS) 560 using an IE6 interface. The AS 560 authorizes access to resources hosted in the SDP 530. For example, the DOEC and the E-ADR request authorization to create a resource relevant to a specific incident in the SDP. The ESP 550 requests authorization to access SD in the SDP 530. When the ESP 550 determines that the SD is no longer needed, the ESP 550 may request the AS 560 to authorize deletion of the resource.

An access authorization may be granted before the ESP 550 accesses the SDP 530 for the data relevant to a specific incident. By limiting the scope of authorization specific to a resource, i.e., the SD to be shared with the ESP, and the duration of the authorization to a short value, the security can be tightened.

The authorization server may grant an access token to the ESP 550 to allow the ESP to access the resource corresponding to the SD on the SDP. The scope of the access token is limited to the data resource relevant to a specific incident, identified by the SD identity as defined above.

In one or more embodiments supported by FIG. 5, the DSIR 520 may communicate with the DOEC 510, the E-ADR 540, or the ESP 550 utilizing an IE3 interface.

In similar embodiments, the SDP 530 may communicate with the DOEC 510 or the E-ADR 540 using an IE4 interface, and the ESP 550 may communicate with E-ADR 540 or SDP 530 using an IE5 interface.

These interfaces are described below in more detail.

Based on FIG. 5, various SD sets could be provided to emergency services providers utilizing an architecture and interfaces as described herein. Utilizing the architecture of FIG. 5, various scenarios may be implemented as different embodiments, depending on the entity that determines the SDP(s) relevant to an incident, e.g. from pre-configured information, by querying the DSIR or by any other method as per the scenarios further described below.

In particular, in a first scenario, the DOEC 510 determines the SDPs relevant to the incident. This embodiment is described below with regards to FIG. 6. In a second embodiment, the E-ADR may determine the SDPs relevant to the incident, as provided with regard to FIG. 7 below. In a third embodiment, the ESP 550 queries the DSIR 520 and determines the SDPs. This third embodiment is described below with regard to FIG. 8.

In each of the three embodiments, the DSIR stores information concerning data sources registered to be available for emergency purposes. These data sources may be owned or administered by one or more data providers.

For each registered data source, the DSIR contains a number of data service characteristics enabling appropriate queries, searches and selection by the DOEC, the E-ADR or the ESP when an emergency call is triggered upon the advent of an incident.

Further, it is assumed that the URI stored in the DSIR is used to refer to the data or record corresponding to selected data source in the corresponding SDP, or may refer to the SDP itself. The ESP may hold the necessary credentials for querying the SDP. Otherwise, the ESP will request access authorization from the Authorization Server.

The DOEC Determines the SDP(s)

Figure 6:
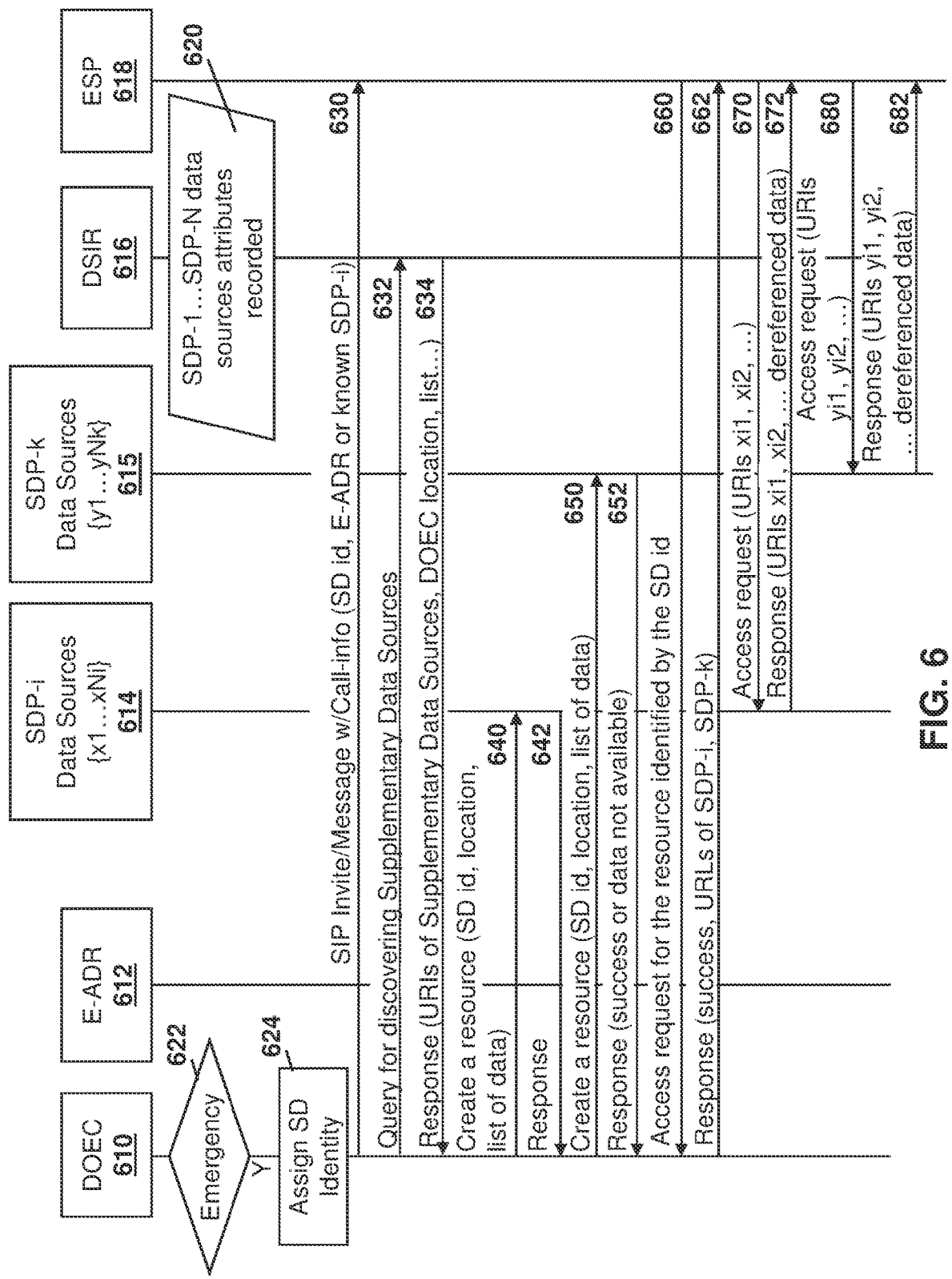
FIG. 6 is a dataflow diagram showing a dataflow when the Device Originating the Emergency Call identifies Supplementary Data Providers.

Reference is now made to FIG. 6. In the embodiment of FIG. 6, the DOEC 610 determines the SDPs relevant to an incident. In particular, in FIG. 6, DOEC 610 may communicate with various entities, including the E-ADR 612, a first SDP 614, a second SDP 615, the DSIR 616 and the ESP 618.

In the embodiment of FIG. 6, the DSIR 616 includes a set of SDP data source attributes recorded, as shown at block 620.

Once an emergency is triggered, as shown at block 622, the process proceeds to block 624 in which the DOEC 610 assigns the SD identity. The SD identity is an identity which uniquely identifies the SD relevant to the emergency incident locally. In one case, the SD identity comprises a locally determined identifier, for example based on a URN specifying the name or address of the organization to which the DOEC 610 belongs together with a random value and or a timestamp. Other identities are possible. The identity also identifies resources created on one or more SDPs to share the SD with the ESP 618.

After assigning the SD identity, the DOEC 610 sends a SIP INVITE/MESSAGE 630 with Call-Info to the ESP 618. The Call-Info includes the SD identifier assigned at block 624, along with the address of the E-ADR 612 or of known SDPs 614 or 615. The message 630 therefore initiates an emergency call or session towards the ESP 618. The Call-Info header of the call or the session originating message includes the SD identity and the address of the SDP(s). The address may be a URI of a relevant SDP, if the DOEC has pre-configured knowledge of this URI. Alternatively, the address may be the URI pointing to a resource at the DOEC.

The ESP 618 utilizes the SD identity and the URI to access the SD. The Call-Info header may also include a URI for access to additional data in the E-ADR 612, among other options.

If the DOEC is not preconfigured with the URI of an SDP resource, then the DOEC 610 will send message 632 to the DSIR 616 to determine one or more SDPs relevant to the incident. The message 632 may carry information including the location information of the DOEC and type of emergency e.g. police, fire.

The DSIR 616 may then send a response 634 with a series of information, including for example the URIs of SD sources, the DOEC location, and a list of data, among other information. In the example of FIG. 6, two SDPs are identified.

Message 632 and response 634 are optional if the DOEC is preconfigured with the URI of an SDP resource.

The DOEC 610 then requests to create a resource in the first identified SDP. The resource is referred to by the SD identity with the first SDP. The resource may then be accessed by the ESP to obtain the SD. Incident data such as a timestamp, location or a list of data may be provided. An example of the list of data is provided in the description of the interfaces below.

Before the DOEC 610 requests the creation of a resource in the SDP 614, it may establish a secure connection with the AS and request an access token. The scope of the access token is requested to the resource identified by the SD identity (not shown). The DOEC 610 includes the access token in a request to create the resource in some cases. The request is sent as message 640 from the DOEC 610 to the SDP 614.

The SDP 614 verifies the access token, and if successfully verified, the SDP creates the resource identified by the SD identity and sends a response 642. The response 642 indicates whether or not the resource was successfully created or if data is not available or other result codes.

As the response 634 included two URIs of SD sources, the process to create a resource can be repeated on the second SD source. In the example of FIG. 6, the DOEC 610 sends a message 650 to the SDP 615 to create a resource. The message 650 may include the SD identifier, incident data such as location and a list of data, and any access tokens.

The SDP 615 may then send a response 652 indicating whether the resource was successfully created or the data is not available, or other result codes.

The ESP 618 may then send an access request for the resources identified by the SD identifier to the DOEC 610, as shown by message 660. In response, the DOEC 610 sends a response 662 with an indication of whether the resource was successfully created, as well as the URLs of the various SDPs on which the resources are created. If the resource was not created, the response 662 can indicate this, or contain other result codes.

The ESP 618 skips message 660 and response 662 if the SDP information is provided by the DOEC 610 in message 630.

The ESP 618 may then access the resource identified by the SD identity of the first identified SDP and receive information about the data made available by the first SDP in the resource that has been created. The ESP accesses the data according to the information. Prior to accessing the first SDP, the ESP may establish a secure channel with the AS to obtain an access token. The scope of the access token is limited to the data relevant to a specific incident, identified by the SD identity (not shown). The access request 670 from the ESP may include the access token. The SDP 614 verifies the access token and if it is successfully verified sends a response 672 to the ESP 618 with the information about the SD. If the access token was not successfully verified by the SDP 614, the response 672 can indicate this, or contain other result codes.

Similarly, the ESP 618 may send an access request 680 to the SDP 615 and the SDP 615 may send a response 682 with the URIs as well as dereferenced data back to the ESP 618. If the access request was denied by the SDP 615, the response 682 can indicate this, or contain other result codes.

Therefore, the embodiment of FIG. 6 provides the scenario where the DOEC 610 determines the SDPs.

E-ADR Determines the SDP(s)

Figure 7:
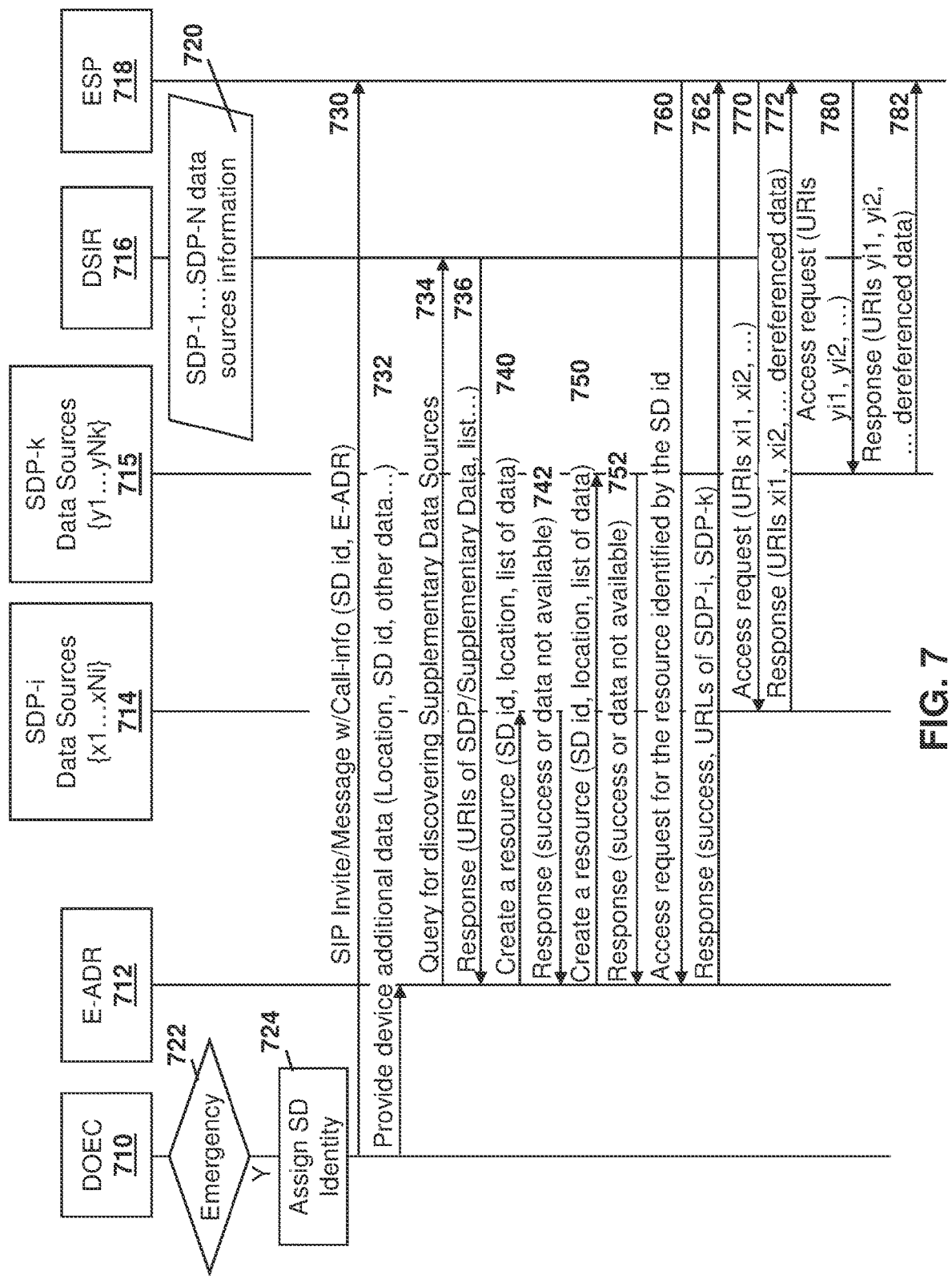
FIG. 7 is a dataflow diagram showing a dataflow when an Enhanced Additional Data Repository identifies Supplementary Data Providers.

In a further embodiment, the E-ADR may determine one or more SDPs relevant to the incident. Reference is now made to FIG. 7. In the embodiment of FIG. 7, the DOEC 710 communicates with E-ADR 712. Further, two SDPs are shown, namely SDP 714 and SDP 715.

The DSIR 716 and the ESP 718 also form part of the emergency network.

In the embodiment of FIG. 7, the DSIR 716 includes the SD sources information 720.

Upon an emergency being signaled by DOEC 710, as shown by block 722, the process proceeds to block 724 in which the DOEC assigns a SD identity. The SD identity is an identity which uniquely identifies the SD relevant to the emergency incident locally. The SD identity may comprise a locally-determined identifier, for example, based on a URN specifying the name or address of the organization to which the DOEC belongs together with a random value and/or a timestamp. However, in other embodiments, the SD identity may be comprised of other data to uniquely identify the SD.

The SD identity also identifies the SD and the resource(s) created in one or more SDPs to share the SD with the ESP 718.

The DOEC may then initiate an emergency call or session towards the ESP 718, as shown with message 730. The Call-Info header of the call or the session originating message includes the SD identity and the address (URI) of the E-ADR 712.

The DOEC 710 may also provide device Additional Data to the E-ADR 712 in message 732. Such Additional Data may include the location information for the DOEC and the SD identity or incident identifier.

Once the E-ADR 712 receives message 732, it may initiate a query for discovering supplementary data sources to the DSIR 716. Query 734 may provide information such as location, emergency type, among other options.

In response to receiving query 734, the DSIR 716 may send a response 736. The response 736 may include the URIs of one or more SDP(s). In the example of FIG. 7, two SDPs are identified. If the query could not be answered by the DSIR 716, the response 736 can indicate this, or contain other result codes.

The E-ADR 712 may then create a resource to the first SDP identified. The resource is referred to by the SD identity in the first SDP 714. The resource is created utilizing message 740 which includes the SD Identity, incident data such as the location and a list of data, among other information.

Further, before the E-ADR 712 requests the creation of the resource on the SDP 714, it may establish a second secure connection with the AS to request an access token. The scope of the access token is limited to data relevant to the specific incident, identified by the SD identity. The E-ADR 712 includes the access token in the message 740. The first SDP 714 verifies the access token and, if verified, the SDP 714 creates the resource identified in the SD identity and sends a response 742. Response 742 may indicate success or that the data is not available, or other result codes.

Similarly, if two SDPs are identified in message 732, then the E-ADR 712 may create a resource as shown with message 750 at SDP 715. A response 752 indicating whether the resource was successfully created or the data is not available may be sent back to the E-ADR 712, or contain other result codes.

The ESP 718 may access the E-ADR 712 utilizing a message 760 for additional data and to receive the URIs of the SDP resources. A response to message 760 is provided as response 762 and includes the URIs of the first and second SDPs in the example of FIG. 7.

The ESP 718 may then access the resources identified by the SD identity in the first identified SDP as shown with access request 770. The ESP accesses the data according to the information received. Prior to accessing the first SDP, the ESP may establish a secure connection with the AS and obtain an access token. The scope of the access token is limited to the data resource relevant to a specific incident, identified by the SD identity. The access request from the ESP 718 may include the access token.

The first SDP 714 verifies the access token and responds to ESP 718 with a response message 772 with information about the data. If the SDP 714 does not verify the access token, the response 772 can indicate this, or contain other result codes.

Similarly, the ESP 718 may access the resource identified by the SD identity in the second identified SDP as shown with access request message 780 to SDP 715. Again, a token may be utilized for such access request.

In response to message 780, the SDP 715 responds with message 782 providing the information about the data. If the SDP 715 cannot grant access, the response 782 can indicate this, or contain other result codes.

The embodiment of FIG. 7 therefore provides the scenario where the E-ADR determines the SDPs.

The ESP Determines the SDPs

Figure 8:
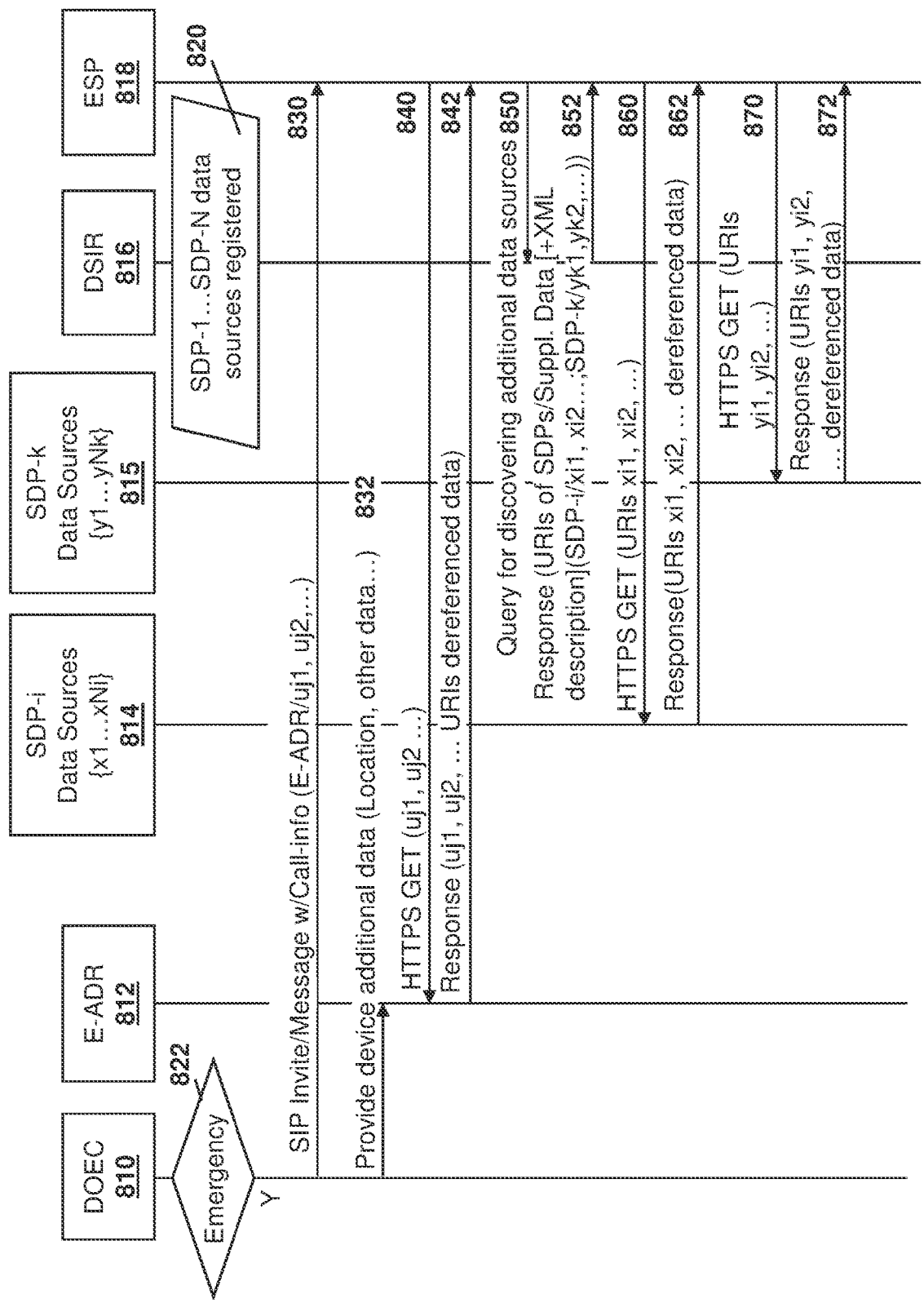
FIG. 8 is a dataflow diagram showing a dataflow when an Emergency Services Provider identifies Supplementary Data Providers.

In a further embodiment, the ESP may determine the SDP or SDPs relevant to the incident. Reference is now made to FIG. 8. In the embodiment of FIG. 8, once a given data source has been registered in the DSIR, the corresponding SDP record typically contains valid data and is available for queries. In this case, data could be updated asynchronously depending on, for example, an associated device, by the data provider, among other options.

In the embodiment of FIG. 8, a DOEC 810 communicates with an E-ADR 812.

Further, in the embodiment of FIG. 8, two data sources, namely SDP 814 and SDP 815 are shown.

In the embodiment of FIG. 8, SDP data sources information are registered at the DSIR 816, shown by block 820.

Upon the advent of an incident as shown at block 822, the DOEC 810 triggers an emergency call or session to an emergency number or towards an emergency URN. Emergency call procedures are initiated by the DOEC with message 830 towards the ESP 818.

In this case, message 830 is a SIP INVITE or, for a noninteractive call, may be a SIP MESSAGE. Other methods may be used in alternative scenarios as indicated above. The message header includes additional information by value and/or reference pointing to the E-ADR.

Additional data related to the call, such as the location or the caller (for example device-based location) may be provided by the DOEC 810 to the E-ADR 812 in message 832. In alternative embodiments, this information is provided to a conventional ADR if the DOEC is enabled for that feature.

Further, in some embodiments, the message 832 may need to be sent prior to message 830 if the URI of the data recorded in the E-ADR or ADR is provided by the E-ADR or ADR and not known by the DOEC at the time the message 830 is sent.

If additional data information was included by reference in message 830, the ESP 818 may retrieve or dereference the corresponding data by performing an HTTPS GET request 840 or similar message towards the E-ADR or the ADR for the URI(s) received in the SIP transaction. In response, the ESP 818 may receive a response 842 providing the corresponding dereferenced data. If the E-ADR or the ADR cannot provide the corresponding dereferenced data, the response 842 can indicate this or contain other result codes.

The ESP 818 may then query the DSIR 816 to determine one or more SDPs that are pertinent to the incident signaled by the emergency call. A request 850 may include data such as an indication of the proximity to the incident location, e.g. a maximum distance or a relevant geographic area, as well as sensor category or a data type, among other such information.

In response to message 850, the DSIR 816 sends response 852 providing the URIs of the SDPs or of supplementary data. If the DSIR 816 cannot provide the requested data, the response 852 can indicate this or contain other result codes.

Thereafter, the ESP 818 may query the corresponding data by performing an HTTPS GET request 860 or similar message towards SDP 814 for the URI(s) received in the DSIR response 852.

The SDP 814 may then provide the URIs and dereferenced data in response 862. If the SDP 814 cannot provide the URIs and dereferenced data, the response 862 can indicate this or contain other result codes.

Similarly, ESP 818 may utilize an HTTPS GET request at message 870 or a similar message to SDP 815 and receive in response the URIs and dereferenced data as message 872. If the SDP 815 cannot provide the URIs and dereferenced data, the response 872 can indicate this or contain other result codes.

IoT for Emergency (IE) Architecture Interfaces

In the embodiment of FIG. 5, and for the messaging of FIGS. 6 to 8, the various entities communicate with other entities utilizing an IoT for Emergency (IE) interface. These are labelled in FIG. 5 as IE1 to IE6. Each interface is described below.

IE1 Interface

The IE1 interface is an interface between the DOEC 510 from FIG. 5 and the ESP 550 for signaling an emergency call based on protocols such as IMS and ISDN. A SD Identity is added to the call-header of the SIP INVITE, re-INVITE, INFO, UPDATE or of a MESSAGE method, or as an information element of the setup message by the DOEC.

Depending on which embodiment of FIGS. 6 to 8 is used, a SD identity may need to be added. In case of SIP signaling, the SD identity may be added according one of the following options.

In a first option, the SD identity may be added as a new header parameter of the SIP transaction. Such SD identity may be added, for example, in the IETF RFC 3261, *"SIP-Session Initiation Protocol"*, for INVITE, or the IETF RFC 3428, *"SIP Extension for Instant Messaging"*, for MESSAGE, among other options.

In a second option, the SD identity may be added as a new parameter in the "Call-Info" header as defined, for example, in IETF RFC 3261. This is shown, for example, in bold in Table 1 below.

TABLE 1

Call-Info header parameter for SD identity in SIP INVITE

INVITE urn:service:sos SIP/2.0
  Via: SIPS/2.0/TLS server.example.com;branch=z9hG4bK74bf9
  Max-Forwards: 70
  To: <urn:service:sos>
  From: John Doe <sips:doe@example.com>;tag=9fxced76sl
  Call-ID: 3848276298220188511@example.com
  Call-Info:
      <http://www.example.com/doe/> ;purpose=info,
      <cid:0123456789@incident.example.com>
        ;purpose=SD_identity,
[...]
--boundary1
Content-Type: application/SD_identity+xml
Content-ID: <0123456789@incident.example.com>
Content-Disposition: by-reference;handling=optional
<?xml version="1.0" encoding="UTF-8"?>
<sdi:SD_identity
  xmlns:sdi=
  "urn:ietf:params:xml:ns:SD_identity">
  <sdi:SD_identity>202002101422-12345678</sdi:SD_identity>

In a third option, the SD identity may be added as a new block of the "additional data" specified for emergency calls in IETF RFC 7852, *"Additional Data Related to an Emergency Call"*. This is shown, for example, in bold in the example of Table 2 below.

TABLE 2

New Additional Data block for SD identity

```
INVITE urn:service:sos SIP/2.0
   Via: SIPS/2.0/TLS server.example.com;branch=z9hG4bK74bf9
   Max-Forwards: 70
   To: <urn:service:sos>
   From: John Doe <sips:doe@example.com>;tag=9fxced76sl
   Call-ID:3848276298220188511@example.com
   Call-Info:
         <http://www.example.com/doe/> ;purpose=info,
         <cid:1234567372@add-data.example.com>
      ;purpose=EmergencyCallData.ProviderInfo,
         <cid: 1234567890@add-data.example.com>
      ;purpose=EmergencyCallData.SD_identity
[...]
   --boundary1
   Content-Type: application/EmergencyCallData.ProviderInfo+xml
   Content-ID: <1234567890@add-data.example.com>
   Content-Disposition: by-reference;handling=optional
   <?xml version="1.0" encoding="UTF-8"?>
   <sdi:EmergencyCallData.SD_identity
      xmlns:dev=
      "urn:ietf:params:xml:ns:EmergencyCallData:SD_identity">
      <sdi:SD_identity>202002101422-12345678</sdi:SD_identity>
   </dev:EmergencyCallData.SD_identity>
[...]
```

In a fourth option, the SD identity may be added as a new information within one of the "additional data" blocks. For example, the SD identity may be added within the "Service Information" block defined in IETF RFC 7852.

In a fifth option, the SD identity may be added by embedding a CAP message as an additional data block as described for Non-Interactive Emergency Calls in IETF draft-ietf-ecrit-data-only-ea-20, "Non-Interactive Emergency Calls". In this case, the information can be transmitted within the "<incidents>" CAP element, for example.

The IE1 interface may also be used to convey relevant SDP URI (if known by the DOEC) or other information known by the DOEC that may assist the ESP in retrieving SD. Similar options to those described above may be specified for enhancing the concerned SIP protocol methods to convey such information.

IE2 Interface

The IE2 interface is an interface between the DOEC 510 and the E-ADR 540. It is based on the interface is defined in the EENA STA-010.3 "NENA i3 standard for next generation 9-1-1". As an example, a device enabled for the given E-ADR 540 provides location information to the E-ADR. The DOEC 510 may also provide an SD identity to the E-ADR 540.

The IE2 interface enhances the existing interface between the DOEC and the ADR. The existing interface supports the device to provide Additional Data in its possession, e.g., the calling party number and location information, to the ESP. Over the enhanced IE2 interface, the DOEC may provide the SD identity, a description of the incident in addition to the calling party number and the location information. The additional information enables the E-ADR to determine SDPs by querying the DSIR and to request the identified SDPs to create resources to share the SD with the ESP. The protocol for the interface may be based on HTTPS, on Constrained Application Protocol (COAP), or on Message Queue Telemetry Transport (MQTT), among other options. An example for HTTPS with content-type JavaScript Object Notation (JSON) is shown below with regard to Table 3.

TABLE 3

Supplementary Data for HTTPS with content-type JSON

```
POST https:/api.eadr.com/eadr/
{
   "callingPartyNumber": "+16471234567",
   "timeStamp": "2020-02-10 14:22",
   "location": "location data",
   "supplementaryDataIdentity": "202002101422-12345678",
   "incidentDescription": "fire"
}
```

IE3 Interface

The IE3 interface is used to query the DSIR 520 about information of SDPs 530 that hold data relevant to a specific incident. The DOEC, ESP, E-ADR or SDP may access the DSIR using the IE3 interface to obtain the URI of SDPs for a specific incident.

The IE3 interface is used to query the DSIR for information about SD sources and/or SDPs that hold data that may be pertinent to a specific incident. The DOEC, the E-ADR or the ESP may access the DSIR to obtain the URI of the SDPs and/or the SD resources selected based on criteria provided by the requesting entity.

Queries to the DSIR may be realized by using different tools such as RESTful Web services/API (such as HTTP or HTTPS queries or OpenAPI), Remote Procedure Call (RPC) or GraphQL APIs, Structured Query Language (SQL) or other languages depending on DSIR implementation choices.

The information stored by the DSIR about the registered data sources may include Additional Data information description as per IETF RFC 7852. The information stored by the DSIR may include further information or extensions for extra parameters that would be required or would be beneficial for determining pertinent data sources, including but not limited to DataInfo.SensorFunction indicating Temperature, Humidity, Gas Detector, Smoke Detector, among other options.

When used in the DSIR, geographic information may be encoded according to a Presence Information Data Format-Location Object (PIDF-LO) scheme as for example provided for in IETF RFC 5491, *"GEOPRIV Presence Information Data Format Location Object (PID F-LOL) usage Classification, Considerations, and Recommendations"*. Such encoding can encode complex shapes. For example, ESP tools may encode the incident location into an "Incident-area.xml" XML file as a geographical shape surrounding by a circle, a polygon, etc., by which it can query for SD sources located within this shape. Other encoding methods may be used.

Examples of pseudocode for querying data sources under some criteria are shown with regard to Table 4 below.

TABLE 4

Example Pseudocode representing queries Data Sources

- GET http://www.dsir.com/search?located IN "Incident-area-1.xml"
- GET http://www.dsir.com/search?located IN "Incident-area-2.xml" &
  EmergencyCallData.DeviceInfo.DeviceClassification="farm"
- GET http://www.dsir.com/search?located IN "Incident-area-3.xml" &
  (EmergencyCallData.DeviceInfo.DeviceClassification="sensor-mobile"
  OR EmergencyCallData.DeviceInfo.DeviceClassification="sensor-fixed")
  & EmergencyCallData.DataInfo.SensorFunction="Temperature"

A query may return a list of URIs pointing to the SDP/data records matching the indicated criteria if there are any, or an empty list otherwise. In some embodiments, the DSIR may return the number of identified data sources and/or the number of identified data records corresponding to the query. If any of these numbers exceeds a certain threshold, the DSIR may limit the returned amount of information to the indicated threshold, for example a first list containing a number of elements corresponding to the threshold. Further to this, the requester may request more information, e.g. a second list which is the continuation of the list previously obtained, or refine the query so that less data sources would be selected.

The query may return a file such as an XML file or a JSON object providing information stored in the DSIR about the retrieved data sources, including part or all the information used for registering the data sources, so that the requester can further assess the relevance of the data source, and for example, down-select or prioritize the information manually or according to some policy. In some cases, the prioritization of information can be automated, or may be assisted using a graphical display of the source on a PSAP CAD, among other options.

For example, pseudocode for a policy used for constructing the query may be specified as shown with regard to Table 5 below.

TABLE 5

Example Pseudocode for a Policy Constructing a Query

/* Location */
- If incident.type is "wood fire" then select source.location within 5 km from incident position else
  If incident.type is "car accident" then select source.location within 100 meters from incident position else
  If incident.type is "flooding" then select source.location within 20 km from incident position and source.linkedto flooding river
  End
/* Source Type */
- If incident.type is "wood fire" then select source_type in ("infra-red camera", "fire detector") else
  If incident.type is "car accident" then select source_type in ("visio camera", "local traffic map")
  End
/* Sources number */
  If returned source_number is higher than 50 then divide location_range by 2
  Reiterate request
  End A returned URI corresponding to a SD resource selected by the DSIR may be one of several URIs. In a first embodiment, the returned URI may be a URI pointing to a data record that can be further retrieved from the SDP, such as: https:/api.sdp1.com/directory-1/data-source-1. In a second embodiment the returned URI may be a URI pointing to the SDP where a resource should be created before retrieving the data such as: https:/api.sdp1.com/sd/.

In some embodiments, a single (absolute) identity may be used to identify a resource within an SDP. In this case, separate identities may be provided to identify the SDP and the resource location within the SDP. One identity may be a relative name or a local name.

The support of the embodiments for the returned URIs may depend on embodiments and implementation options of the concerned entities and would typically be implemented consistently between the ESP and each SDP.

For the embodiments described above for IE3, the DSIR client is assumed to hold the appropriate credentials to access a given DSIR. In case of a distributed DSIR, either same or different credentials sets may be used for each of the multiple DSIR components.

IE4 Interface

The IE4 interface provides an API to request one of the identified SDPs 530 to create a resource for the ESP 550 to access data relevant to a specific incident. The SDP 530 may hold data about IoT devices for normal business operation. Upon receiving the request to create a resource with the SD identity over IE4, the SDP 530 may select a subset of the data that can be shared with the ESP 550 according to a configured policy and make it available through the resource created. The interface may be based on the HTTPS or HTTP protocol. A PUT method or a POST method may be used to create a resource in some embodiments.

Thus, the primary feature of the IE4 interface is to provide an API to enable a client (a DOEC, an E-ADR, an SDP or an ESP) to create a resource within an SDP. The created resource is used for sharing SD for a specific incident with the ESP. The resource is identified by the SD identity. The request for creating the resource may include the SD identity, incident data such as a timestamp of the incident, the location of the incident, a list of data to be shared through the resource and an access token. The access token may include the authorization scope limited to the SD identity.

When the SDP receives the request, the SDP verifies that the access token is properly signed and if the token is scoped with the SD identity. If the token is successfully verified, the SDP may determine if the data source information is provided. If the information is provided, the SDP may determine whether the data source can be shared with the ESP based on a policy configured in the SDP. If the SDP determines that the data source can be shared, the SDP identifies and stores data asset information including at least one attribute of the data to be made available to the ESP associated with the data source. For example, the data asset information may describe data type, such as video stream, integer or character types, the time of the data captured, among other options.

The SDP may also request the data source (e.g. an IoT device or sensor) corresponding to the data asset to provide up to date data so that when the ESP requests access, the SDP can provide the most recent information. In one embodiment, the data source may subscribe to a command or topic (request for update) and the SDP may publish the command or the topic utilizing MQTT or a similar protocol to refresh the data.

If there is no data source information provided in the request, the SDP may search and identify a data source to be shared with the ESP, based on the location information and the timestamp information included in the request. For example, the SDP may find a data source provided by a sensor close to the location information. The validity of the related data may be subject to timing considerations compared to the indicated timestamp (for example data age not exceeding the timestamp by a threshold). The SDP determines if the data source can be shared with the ESP according to a policy configured in the SDP. If the SDP determines that the data source can be shared with the ESP, the SDP identifies and stores the data asset information associated with the data source.

The protocol for the interface may be based on HTTPS, COAP, MQTT or similar protocols. An example for HTTPS with the content-type JSON is shown below with regards to Table 6 to create the resource with the SD identity equal to 202002101422-12345678.

TABLE 6

Example HTTPS to Create Resource

```
PUT https://api.sdp.com/sd/202002101422-12345678
{
    "callingPartyNumber": "+16471234567",
    "timeStamp": "2020-02-10 14:22",
    "location": "location data",
    "incidentDescription": "fire",
    "dataSource": [
        {"sourceIdentity": "videoCamera-123", "status": "updated"},
        {"sourceIdentity": "thermostat-456", "status": "updated"}
    ]
}
```

IE5 Interface

The IE5 interface provides an API for the ESP 550 to access a specific resource to obtain the SD relevant to a specific incident from the SDP. In one embodiment it is based on an HTTPS GET method applied to the resource identified by the SD identity on the SDP 530.

The IE5 may also provide an API for the ESP 550 to delete the resources, based on an HTTPS DELETE method in some embodiments.

In some embodiments, interfaces used for accessing the SDP 530 and the E-ADR 540 are based on the same IE5 principles and specifications. In other embodiments, different interfaces may be specified for accessing the SDP 530 and the E-ADR 540.

The primary feature of the IE5 interface is to enable the ESP to access SD related to a specific incident from an SDP. The ESP is provided with the address information of an SDP (e.g. a URI) and, depending on the scenario, the SD identity or the URI of the SD, by an E-ADR, DSIR or DOEC depending on the scenarios described above. The ESP may obtain an access token from the AS and include the token in the request to access the resource on the SDP, identified by the SD identity.

When the target resource is specified as the SD identity as shown in the example of Table 7 below, the SDP responds with the information of the data made available through the resource. The data is based on the asset information the SDP has identified and then stored.

The protocol for the interface may be based on HTTPS, COAP, MQTT or similar protocols. An example for HTTPS with the content type JSON is shown in the example of Table 7 below. In response to the GET message sent to the resource, identified by the SD identity 202002101422-12345678, the ESP receives the hyperlink of the two other SDPs and a description of SD available from the SDP, to which the HTTPS GET request was sent. The ESP may send subsequent HTTPS GET requests to the two other SDPs and the two specific media assets identified for the SD identity.

TABLE 7

Example HTTPS GET to Obtain Supplementary Data

```
GET https://api.sdp.com/sd/202002101422-12345678
{
    "otherSDPs": [
        {"href": "api.otherSdp-1.com"},
        {"href": "api.otherSdp-2.com"}
    ]
    "supplementaryData": [
    {"title":"data from camera 123","encoding":"H265",
"mediaAsset":"urn:sdp.app1:ABC-12345678", "timestamp":"2020-02-10
14:25"},
```

TABLE 7-continued

Example HTTPS GET to Obtain Supplementary Data

```
{"title":"data from thermostat 567","encoding":text",
"mediaAsset":"urn:sdp.app1:XYZ-12345678", "timestamp":"2020-02-10
14:00"}
    ]
}
```

Utilizing the example of Table 7 above, if the target resource is indicated in the request as the URI of the SD, the SDP will provide the SD in the response.

IE6 Interface

The IE6 interface is the interface used to access the authorization Server 560 by various entities including the DOEC 510, the E-ADR 540, the SDP 530 or the ESP 550. In one embodiment, the interface is based on the OAuth 2.0 protocol. However, this is merely an example and other protocols could be used.

Through the IE6 interface, the requesting entity may obtain an access token to access resources in the resource servers. For example, the DOEC and the E-ADR may request authorization to create a resource relevant to a specific incident in the SDPs 530. An SDP 530 may request authorization to create a resource in another SDP.

The ESP 550 may request authorization to access SD shared by the SDP as a resource server. When the ESP 550 determines that the SD is no longer needed, the ESP 550 may request authorization to delete the resource. The scope of the authorization or access token requested over the OAuth 2.0 protocol may be limited to the resources identified by the SD identity to prevent access to data in the SDPs that is not relevant to the incident. The type of authorization grant is a client credential as described above.

Before accessing the SDPs, the client may obtain an access token. It is assumed that the DOEC, E-ADR, SDP and ESP can establish a secure channel with the AS.

Before requesting to create a resource in the SDP, the E-ADR or the DOEC may request the AS to issue an access token with a scope limited to the SD identity and create operation. For a token issued with a limited scope, a validity duration may be set to a short value. The token may be included in the authorization header of a HTTPS POST or PUT message.

Before requesting to access SD from the SDP, the ESP may request the AS to issue an access token with a scope limited to the SD identity and read operation. For a token issued with a limited scope, a validity duration may be set to a short value. The token may be included in the authorization header of a HTTPS GET message.

Before requesting to delete the resource identified by the SD identity, the ESP may request the AS to issue an access token with a scope limited to the SD identity and delete operation. For a token issued with a limited scope, a validity duration may be set to a short value. The token may be included in the authorization header of a HTTPS DELETE message.

Registration of Data Sources to Emergency Services

The registration for supplementary data access for emergency purposes by the ESP such as the ESP 550 typically consists in providing a set of information related to the corresponding data sources and storing this information in the DSIR, such as the DSIR 520. The DSIR can be then further queried for identifying a subset of data sources corresponding to one or more search criteria, such as but not limited to a location of an incident, sensor or data types of interest, among other information.

The data sources registration may take place according to procedures established between the data provider and the emergency services authority or a delegated representation. This may involve, for example the prior identification and agreement of the SD provider by a public safety/emergency services authority (or a delegated administration). It may further involve the selection of a set of data sources in the provider's network or platform that may be of interest for the emergency services. It may further involve the provision of a list of selected data sources and related information so that the data sources can be recorded into the DSIR (this may be an automated process) and further retrieve according to the embodiments described above. It may further involve the provision of sufficient information about the encoding format of the data that can be accessed by the ESP. Such encoding format may be specified according to one of a plurality of encoding means such as XML, JSON, ASN.1 or other formats. The selected encoding format may be stored as an indication by the DSIR and this indication may be used when the data is retrieved. In other embodiments, the selected encoding format may be indicated by the SDP at the time the data is retrieved (which may allow more flexible data format adaptation). Depending on the embodiment, an encoding format may be associated to a particular data source, to multiple data sources associated to a given SDP, to multiple data sources recorded within a DSIR. Other embodiments are possible.

In some embodiments a discovery process may be used to automatically find available data sources in the provider's network, so that the process for registering data source information into the DSIR may be facilitated or automated. Such discovery process may require the definition of discovery policies on both the provider side (for example about which data sources and which corresponding data could be shared) and on the emergency services side (for example about how to select which data sources and which corresponding data are of interest for emergency purposes). The discovery process may be based on the modelling of the data sources or of the data according to different formats (for example XML, JSON, ASN.1) or techniques (for example semantic interoperability techniques using appropriate representations and dictionaries, ontologies-based techniques such as oneM2M Smart Device Template (SDT), ETSI Smart Applications REFerence (SAREF), in some examples).

The registration operation may require the authentication of the SD provider towards the emergency administration platform (e.g. the ESP), or a mutual authentication between the two parties. This may require a partnership/interworking agreement between the two parties. The SD provider may be supplied with credentials required to perform the registration of SD sources.

The information stored by the DSIR related to data sources may include part or all of Additional Data information, for example but not limited to data structures, data blocks, data elements or fields, as specified by IETF RFC 7852, with possible extensions for supplementary information that may be added.

Some information such as Data Provider information and Service information may be common to a set of data sources. The provision of a subset of information (e.g. Data Provider ID, Data Provider Contact URI, etc.) may be made mandatory for the registration process and/or enforced by the registration procedures or policies. Whether supplying an information is mandatory or not may be conditional on the data source type or on other conditions.

Specific information or procedural requirements may apply to the registration of consumer devices or data sources owned or managed by individuals rather than by enterprises or organizations. Specific verification procedures may be enforced based on user or device related information (for example the registration of devices using anonymous Universal Integrated Circuit Card (UICC) or Subscriber Identification Module (SIM) may not be permitted), on obtained device type certification, or on other properties, in order to ensure a minimum level of trust for the associated data.

Hardware

The servers, IoT devices, SDPs and electronic devices performing the methods described above may be any electronic device or network node. Such electronic device or network node may include any type of computing device, including but not limited to, mobile devices such as smartphones or cellular telephones. Examples can further include fixed or mobile user equipments, such as IoT devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), pedestrians and bicycles and other types of vehicles including any combinations of any of the foregoing, whether currently existing or after arising.

Figure 9:
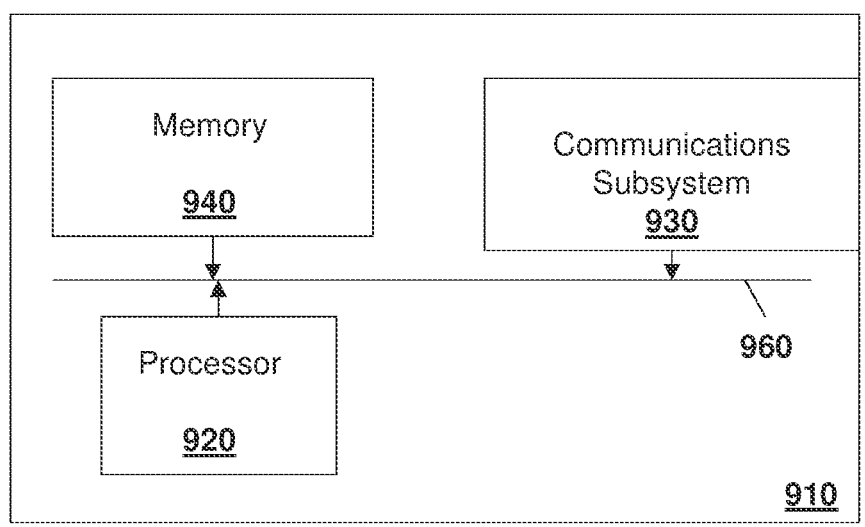
FIG. 9 is a block diagram of a simplified electronic device capable of being used with the methods and systems herein according to one embodiment.

One simplified diagram of a network element or an electronic device is shown with regard to FIG. 9.

In FIG. 9, device 910 includes a processor 920 and a communications subsystem 930, where the processor 420 and communications subsystem 930 cooperate to perform the methods of the embodiments described above. Communications subsystem 920 may, in some embodiments, comprise multiple subsystems, for example for different radio and wired technologies.

The processor 920 is configured to execute programmable logic, which may be stored, along with data, on device 910, and shown in the example of FIG. 9 as memory 940. Memory 940 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 940, device 910 may access data or programmable logic from an external storage medium, for example through communications subsystem 930.

The communications subsystem 930 allows device 910 to communicate with other devices or network elements and may vary based on the type of communication being performed. Further, communications subsystem 930 may comprise a plurality of communications technologies, including any wired or wireless communications technology.

Communications between the various elements of device 910 may be through an internal bus 960 in one embodiment. However, other forms of communication are possible.

Further, if the electronic device, IoT Device, or DOEC has user equipment capabilities, one example electronic device is described below with regard to FIG. 10.

The electronic device 1000 may comprise a two-way wireless communication device having voice or data communication capabilities or both. Electronic device 1000 may have the capability to communicate with other computer systems. Depending on the exact functionality provided, the electronic device may also be referred to as a data messaging device, a two-way pager, a wireless e-mail device, a smartphone, a cellular telephone with data messaging capabilities, a wireless Internet appliance, a wireless device, a mobile device, an embedded cellular modem or a data communication device, as examples. The electronic device 1000 may also have wired communication capability (e.g. USB or Ethernet).

Where electronic device 1000 is also enabled for two-way communication through cellular, it may incorporate a communication subsystem 1011, including a receiver 1012 and a transmitter 1014, as well as associated components such as one or more antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the electronic device is intended to operate.

Network access requirements will also vary depending upon the type of network 1019. In some networks, network access is associated with a subscriber or user of the electronic device 1000. An electronic device may require an embedded or a removable user identity module (RUIM) or a subscriber identity module (SIM) card or a UMTS SIM (USIM) in order to operate on a network. The USIM/SIM/RUIM interface 1044 is normally similar to a card-slot into which a USIM/SIM/RUIM card can be inserted and ejected. The USIM/SIM/RUIM card can have memory and hold many key configurations 1051, and other information 1053 such as identification, and subscriber related information.

When required network registration or activation procedures have been completed, electronic device 1000 may send and receive communication signals over the network 1019. As illustrated in FIG. 10, network 1019 can include multiple base stations communicating with the mobile device.

Signals received by antenna 1016 through communication network 1019 are input to receiver 1012, which may perform such common receiver functions as signal amplification, frequency down conversion, filtering, channel selection and the like. Analog to digital (A/D) conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog (D/A) conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Electronic device 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem or DSRC subsystem, and any other device subsystems generally designated as 1042. Serial port 1030 could include a USB port, On-Board Diagnostics (OBD) port or other port known to those in the art.

Figure 10:
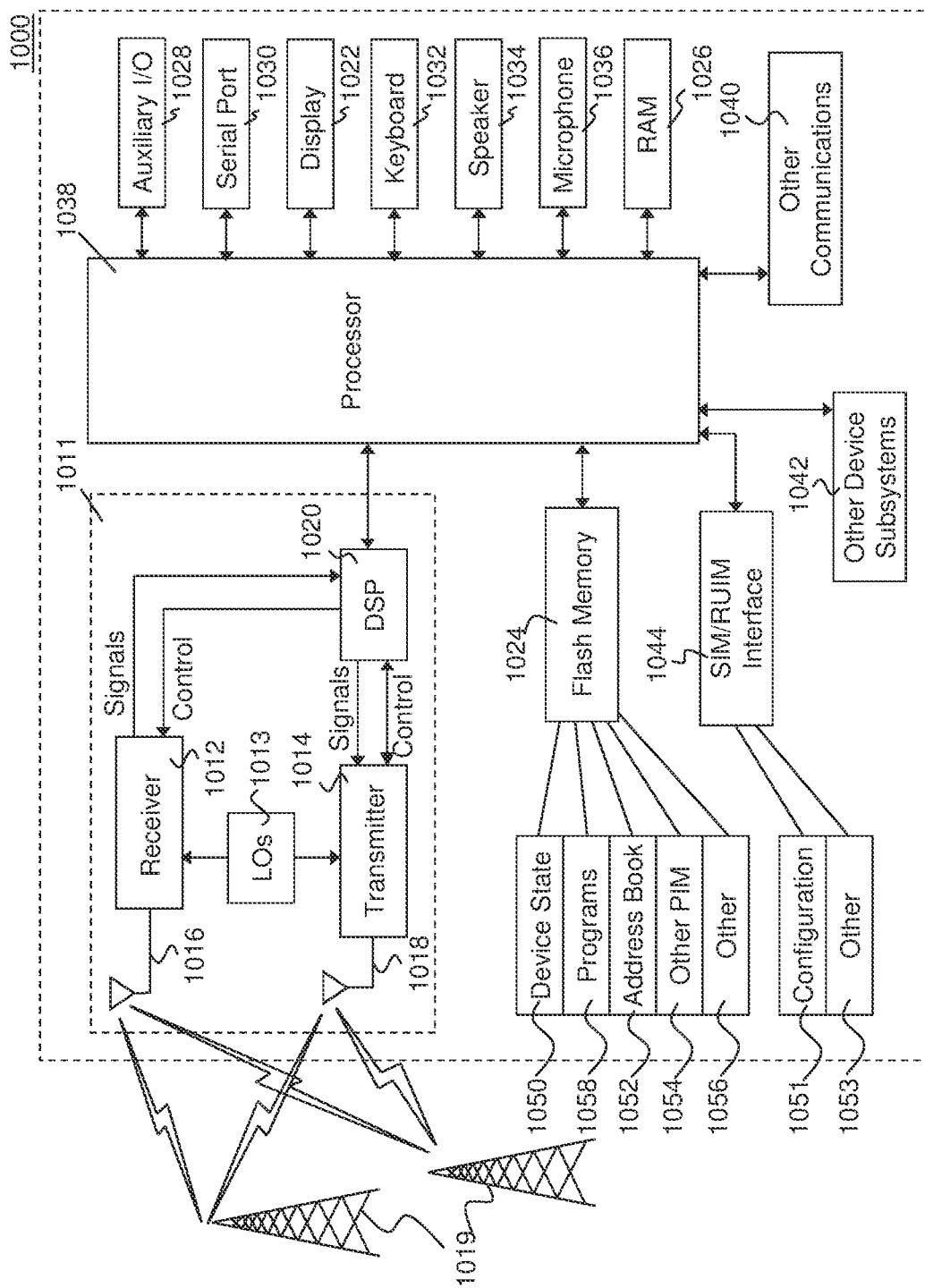
FIG. 10 is a block diagram of a mobile device capable of being used with the methods and systems herein.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the electronic device. A predetermined set of applications that control basic operations, including potentially data and voice communication applications for example, will normally be installed on electronic device 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the electronic device such as, but not limited to, e-mail, messages, calendar events, voice mails, appointments, and task items. Further applications, including productivity applications, messaging applications, social media applications, games, among others, may also be loaded onto the electronic device 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both.

In a data communication mode, a received signal such as a text message or Web page download will be processed by the communication subsystem 1011 and input to the processor 1038, which may further process the received signal for output to the display 1022, or alternatively to an auxiliary I/O device 1028.

A user of electronic device 1000 may also compose data items such as messages for example, using the keyboard 1032, which may be a complete alphanumeric keyboard or telephone-type keypad, either physical or virtual, among others, in conjunction with the display 1022 and possibly an auxiliary I/O device 1028. Such composed items may then be transmitted over a communication network through the communication subsystem 1011.

Where voice communications are provided, overall operation of electronic device 1000 is similar, except that received signals may typically be output to a speaker 1034 and signals for transmission may be generated by a microphone 1036. Alternative voice or audio I/O subsystems, such as a voice message recording subsystem, may also be implemented on electronic device 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 may be implemented in an electronic device for which synchronization with a user's desktop computer (not shown) may be desirable, but is an optional device component. Such a port 1030 may enable a user to set preferences through an external device or software application and may extend the capabilities of electronic device 1000 by providing for information or software downloads to electronic device 1000 other than through a wireless or wired communication network. As will be appreciated by those skilled in the art, serial port 1030 can further be used to connect the electronic device to a computer to act as a modem or for charging a battery on the electronic device.

Other communications subsystems 1040 may further provide for communication between electronic device 1000 and different systems or devices, which need not necessarily be similar devices. For example, the subsystem 1040 may include an infrared device and associated circuits and components or a Bluetooth™ or Bluetooth™ Low Energy communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a Supplementary Data Provider within an emergency services network, the method comprising:
   receiving a message at the Supplementary Data Provider, the message including an identifier and incident data, wherein the identifier is a Supplementary Data identifier created by a device originating an emergency call, the Supplementary Data identifier comprising at least one of a random number or a timestamp;
   responsive to receiving the message, creating a resource at the Supplementary Data Provider based on the incident data, the resource being uniquely identified at the Supplementary Data Provider by the Supplementary Data identifier;
   receiving an access request from an Emergency Services Provider for Supplementary Data associated with the resource; and
   responsive to receiving the access request, providing a response with the Supplementary Data.

2. The method of claim 1, wherein the message is received from a device originating an emergency call.

3. The method of claim 1, wherein the message is received from an Enhanced Additional Data Repository.

4. The method of claim 1, wherein the message further includes an access token from an authorization server.

5. The method of claim 4, wherein the access token provides a scope to limit data resources to a specific incident identified by the identity.

6. The method of claim 1, wherein the access request includes an access token to limit access to data resources related to a specific incident identified by the identity.

7. The method of claim 1, wherein each of the receiving the message and the receiving the access request utilizes one of a Hypertext Transfer Protocol Secure (HTTPS), Constrained Application Protocol (COAP), or MQ Telemetry Transport (MQTT) interface.

8. The method of claim 7, wherein the message is an HTTPS PUT message.

9. The method of claim 7, wherein the access request is an HTTPS GET message.

10. A Supplementary Data Provider within an emergency services network, the Supplementary Data Provider comprising:
    a processor; and
    a communications subsystem,
    wherein the Supplementary Data Provider is configured to:
      receive a message, the message including an identifier and incident data, wherein the identifier is a Supplementary Data identifier created by a device originating an emergency call, the Supplementary Data identifier comprising at least one of a random number or a timestamp;
      responsive to receipt of the message, create a resource at the Supplementary Data Provider based on the incident data, the resource being uniquely identified at the Supplementary Data Provider by the Supplementary Data identifier;
      receive an access request from an Emergency Services Provider for Supplementary Data associated with the resource; and
      responsive to receipt of the access request, provide a response with the Supplementary Data.

11. The Supplementary Data Provider of claim 10, wherein the message is received from a device originating an emergency call.

12. The Supplementary Data Provider of claim 10, wherein the message is received from an Enhanced Additional Data Repository.

13. The Supplementary Data Provider of claim 10, wherein the message further includes an access token from an authorization server.

14. The Supplementary Data Provider of claim 13, wherein the access token provides a scope to limit data resources to a specific incident identified by the identity.

15. The Supplementary Data Provider of claim 10 wherein the access request includes an access token to limit access to data resources related to a specific incident identified by the identity.

16. The Supplementary Data Provider of claim 10, wherein each of the receiving the message and the receiving the access request utilizes one of a Hypertex Transfer Protocol Secure (HTTPS), Constrained Application Protocol (COAP), or MQ Telemetry Transport (MQTT) interface.

17. The Supplementary Data Provider of claim 16, wherein the message is an HTTPS PUT message.

18. The Supplementary Data Provider of claim 16, wherein the access request is an HTTPS GET message.

19. A non-transitory computer readable medium for storing instruction code, which, when executed by a processor of a Supplementary Data Provider within an emergency services network cause the Supplementary Data Provider to:
    receive a message, the message including an identifier and incident data, wherein the identifier is a Supplementary Data identifier created by a device originating an emergency call, the Supplementary Data identifier comprising at least one of a random number or a timestamp;
    responsive to receipt of the message, create a resource at the Supplementary Data Provider based on the incident data, the resource being uniquely identified at the Supplementary Data Provider by the Supplementary Data identifier;
    receive an access request from an Emergency Services Provider for Supplementary Data associated with the resource; and
    responsive to receipt of the access request, provide a response with the Supplementary Data.

* * * * *